United States Patent
Chandrashekar et al.

(10) Patent No.: US 12,513,578 B2
(45) Date of Patent: Dec. 30, 2025

(54) PHYSICAL CELL IDENTITY COLLISION RESOLUTION FOR WIRELESS NETWORKS

(71) Applicant: Nokia Technologies Oy, Espoo (FI)

(72) Inventors: Subramanya Chandrashekar, Bangalore (IN); Ahmad Awada, Munich (DE); Halit Murat Gürsu, Munich (DE); Alperen Gundogan, Munich (DE); Panagiotis Spapis, Munich (DE)

(73) Assignee: Nokia Technologies Oy, Espoo (FI)

( * ) Notice: Subject to any disclaimer, the term of this patent is extended or adjusted under 35 U.S.C. 154(b) by 329 days.

(21) Appl. No.: 18/557,830

(22) PCT Filed: Apr. 12, 2022

(86) PCT No.: PCT/EP2022/059772
§ 371 (c)(1),
(2) Date: Oct. 27, 2023

(87) PCT Pub. No.: WO2022/233545
PCT Pub. Date: Nov. 10, 2022

(65) Prior Publication Data
US 2024/0214879 A1    Jun. 27, 2024

(30) Foreign Application Priority Data

May 5, 2021 (IN) .............................. 202141020500
Oct. 1, 2021 (IN) .............................. 202141044622

(51) Int. Cl.
*H04W 36/00* (2009.01)
*H04W 36/08* (2009.01)

(52) U.S. Cl.
CPC ... *H04W 36/0058* (2018.08); *H04W 36/0061* (2013.01); *H04W 36/087* (2023.05)

(58) Field of Classification Search
None
See application file for complete search history.

(56) References Cited

U.S. PATENT DOCUMENTS

2014/0112180 A1    4/2014  Axmon et al.

FOREIGN PATENT DOCUMENTS

WO    2022/038308 A1    2/2022
WO    2022/233909 A1    11/2022

OTHER PUBLICATIONS

"3rd Generation Partnership Project; Technical Specification Group Radio Access Network; NG-RAN; F1 application protocol (F1AP) (Release 16)", 3GPP TS 38.473, V16.6.0, Jul. 2021, pp. 1-463.

(Continued)

*Primary Examiner* — Saad Khawar
(74) *Attorney, Agent, or Firm* — Nokia Technologies Oy

(57) ABSTRACT

A method includes receiving via a serving cell that is associated with a first distributed unit of the network node, a list of conflicting physical cell identities and a request to provide an indication of whether a measured cell is intra-distributed unit or inter-distributed unit with respect to the serving cell; determining a physical cell group identifier of the serving cell; determining, by the user equipment, a physical cell group identifier of the measured cell; comparing the physical cell group identifier of the measured cell to the physical cell group identifier of the serving cell, to determine whether: the measured cell is intra-distributed unit with respect to the serving cell, or the measured cell is inter-distributed unit with respect to the serving cell; and sending a layer 1 measurement report including information indicating whether the measured cell is intra-distributed unit or inter-distributed unit with respect to the serving cell.

20 Claims, 21 Drawing Sheets

(56) References Cited

OTHER PUBLICATIONS

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

"LS on TCI State Update for L1/L2-Centric Inter-Cell Mobility", 3GPP TSG RAN WG1 Meeting #104-e, R1-2102248, RAN1, Jan. 25-Feb. 5, 2021, 3 pages.

"New WID: Further enhancements on MIMO for NR", 3GPP TSG RAN Meeting #86, RP-193133, Agenda: 9.1.1, Samsung, Dec. 9-12, 2019, 5 pages.

"[Draft] LS Reply on TCI State Update for L1/L2-Centric Inter-Cell Mobility", 3GPP TSG-RAN WG2 Meeting #114 electronic, R2-2106315, Samsung, May 19-27, 2021, pp. 1-4.

"Msc-generator", Sourceforge, Retrieved on Nov. 24, 2023, Webpage available at : https://sourceforge.net/projects/msc-generator/.

"Agenda", 3GPP TSG-RAN WG3 #109-e, R3-20xxxx, Agenda: 3, Chairman, Aug. 17-28, 2020, 116 pages.

"Summary of Offline Discussion on CB: # 1001_SONMDT_PCISelect", 3GPP TSG-RAN WG3 #109-e, R3-205508, Agenda: 10.2.1.1, Huawei, Aug. 17-28, 2020, 9 pages.

"3rd Generation Partnership Project; Technical Specification Group Radio Access Network; Study on RAN-centric data collection and utilization for LTE and NR (Release 16)", 3GPP TR 37.816, V16.0.0, Jul. 2019, pp. 1-35.

"Summary of Offline Discussion on CB: # 1001_SONMDT_PCISelect", 3GPP TSG-RAN WG3 #110-e, R3-206877, Agenda: 10.2.1.1, Huawei, Nov. 2-12, 2020, 4 pages.

International Search Report and Written Opinion received for corresponding Patent Cooperation Treaty Application No. PCT/EP2022/059772, dated Aug. 2, 2022, 14 pages.

"PCI confusion issue", 3GPP TSG-RAN WG2 #99, R2-1708680, Agenda: 10.2.8, Nokia, Aug. 21-25, 2017, 3 pages.

"Discussion on PCI confusing in case of Pscell change due to Pcell change", 3GPP TSG-RAN WG3 #103bis, R3-191248, Agenda: 9.3.18, ZTE, Apr. 8-12, 2019, 3 pages.

"Enhancements on Multi-beam Operation", 3GPP TSG-RAN WG1 Meeting #103-e, R1-2009288, Agenda: 8.1.1, Ericsson, Oct. 26-Nov. 13, 2020, 20 pages.

400

| DU ID | DU-PCI | CU-PCIG |
|---|---|---|
|  | 1 | 1 | A |
|  | 1 | 2 | A |
|  | 1 | 3 | A |
|  | 1 | 4 | A |
|  | 2 | 5 | B |
|  | 2 | 6 | B |
|  | 2 | 7 | B |
|  | 2 | 8 | B |

FIG. 4

PHYSICAL CELL IDENTITY COLLISION RESOLUTION FOR WIRELESS NETWORKS

RELATED APPLICATION

This application claims priority to PCT Application No. PCT/EP2022/059772, filed Apr. 12, 2022, and entitled "PHYSICAL CELL IDENTITY COLLISION RESOLUTION FOR WIRELESS NETWORKS", which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment from a centralized unit of a network node via a serving cell of the user equipment that is associated with a first distributed unit of the network node, a list of conflicting physical cell identities and a request to provide an indication of whether a measured cell is intra-distributed unit or inter-distributed unit with respect to the serving cell, wherein each physical cell identity identifies a respective cell, and wherein each distributed unit is assigned a unique physical cell group identifier; determining, by the user equipment, a physical cell group identifier of the serving cell as a physical cell group identifier assigned to the first distributed unit; determining, by the user equipment, a physical cell group identifier of the measured cell; comparing, by the user equipment, the physical cell group identifier of the measured cell to the physical cell group identifier of the serving cell, to determine whether: the measured cell is intra-distributed unit with respect to the serving cell, or the measured cell is inter-distributed unit with respect to the serving cell; and sending, by the user equipment to the first distributed unit associated with the serving cell, a layer 1 (L1) measurement report including measurement data for the measured cell and information indicating whether the measured cell is intra-distributed unit or inter-distributed unit with respect to the serving cell.

According to an example implementation, a method includes sending, by a centralized unit of a network node to a user equipment via a serving cell of the user equipment that is associated with a first distributed unit of the network node, a list of conflicting physical cell identities and a request for the user equipment to provide to the first distributed unit an indication of whether a measured cell is intra-distributed unit or inter-distributed unit with respect to the serving cell, wherein each physical cell identity identifies a respective cell; and receiving, by the centralized unit, a message from the user equipment relating to whether the measured cell is intra-distributed unit or inter-distributed unit with respect to the serving cell.

According to an example implementation, a method includes forwarding, by a first distributed unit of a network node from a centralized unit of the network node to a user equipment via a serving cell of the user equipment that is associated with the first distributed unit of the network node, a list of conflicting physical cell identities and a request for the user equipment to provide to the first distributed unit an indication of whether a measured cell is intra-distributed unit or inter-distributed unit with respect to the serving cell, wherein each physical cell identity identifies a respective cell; and receiving, by the first distributed unit from the user equipment, information indicating whether the measured cell is intra-distributed unit or inter-distributed unit with respect to the serving cell.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of implementations are set forth in the accompanying drawings and the description below. Other features will be apparent from the description and drawings, and from the claims.

BRIEF DESCRIPTION OF THE DRAWINGS

FIG. 4 is a table illustrating an association of DU-PCI with CU-PCIG according to an example implementation.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
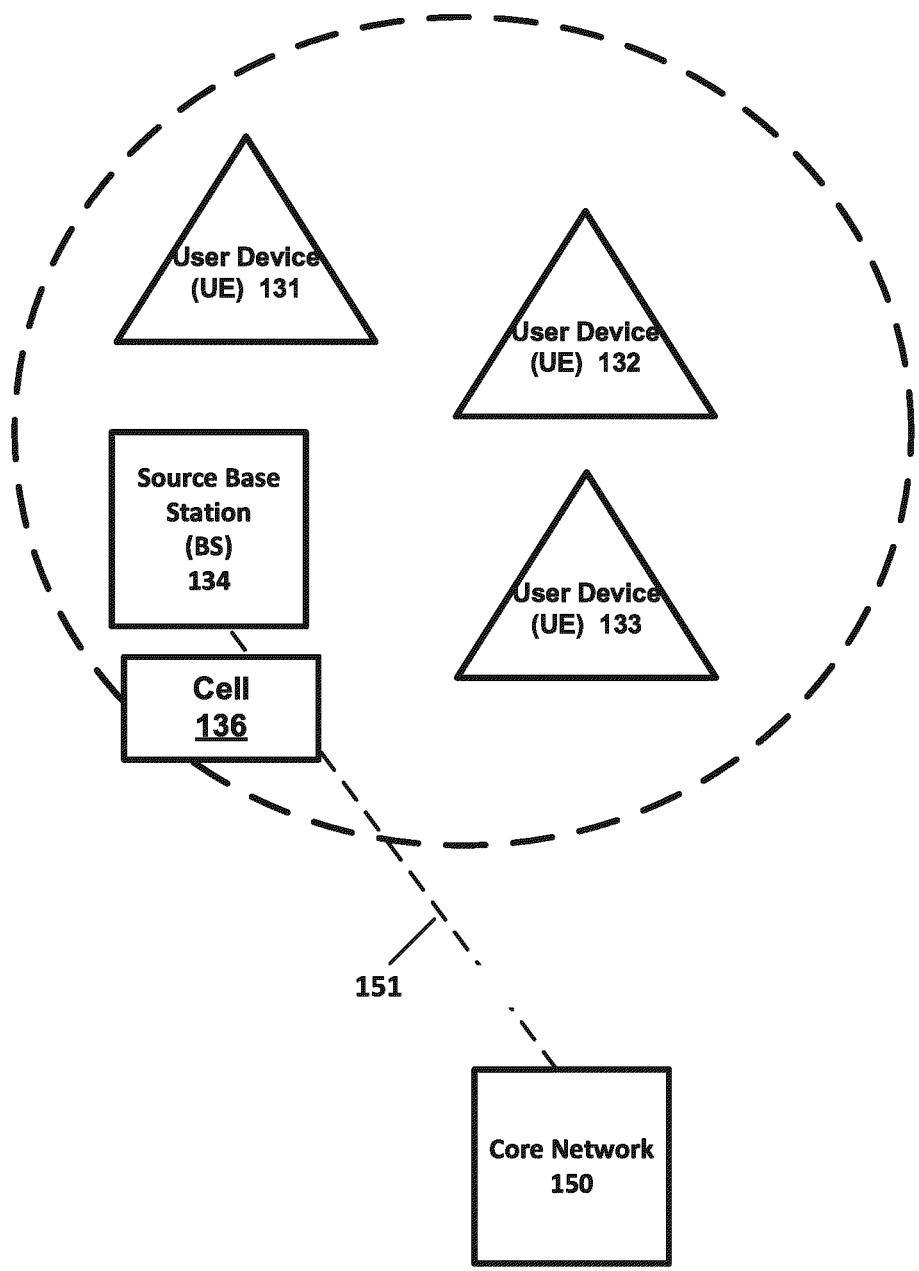
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IOT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Figure 2:
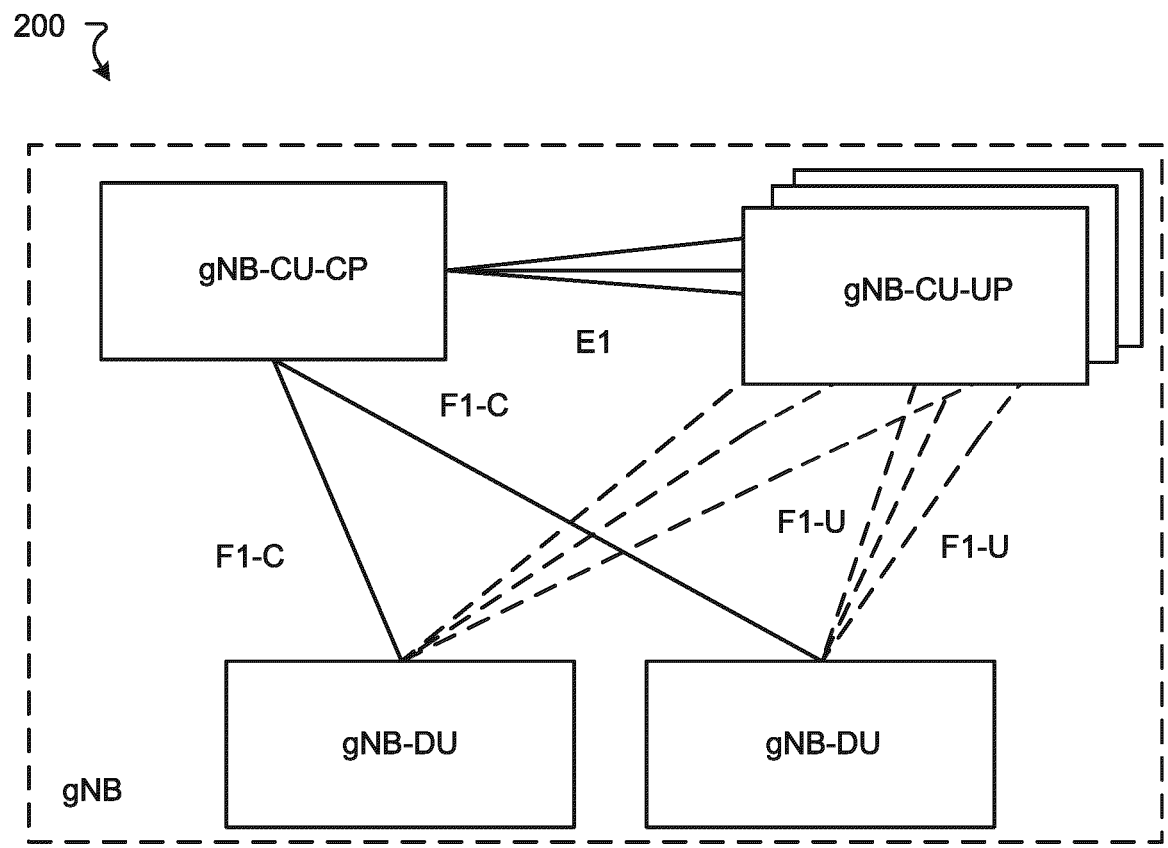
FIG. 2 is a diagram illustrating a disaggregated gNB architecture according to an example implementation.

A disaggregated architecture is defined in the 3GPP standard as a decomposition of a network node (gNB) into multiple logical entities. FIG. 2 illustrates such an architecture 200, in which a gNB has a centralized unit (gNB-CU) and distributed units (gNB-DUs). In FIG. 2, it can be understood gNB-CU and gNB-DUs are collocated, but it can be also understood that gNB-CU and gNB-DUs may not be collocated. As shown in FIG. 2, the gNB-CU itself can be split into a control plane component (gNB-CU-CP) and a user plane component (gNB-CU-UP). The gNB-CU can be also considered as single component containing both control plane component and user plane component. In FIG. 2, the gNB-CU-CP is connected to the gNB-CU-UP via an E1 connection, the gNB-DUs are connected to the gNB-CU-CP via a F1-C connection, and the gNB-DUs are connected to the gNB-CU-UP via a F1-U connection.

Figure 3A:
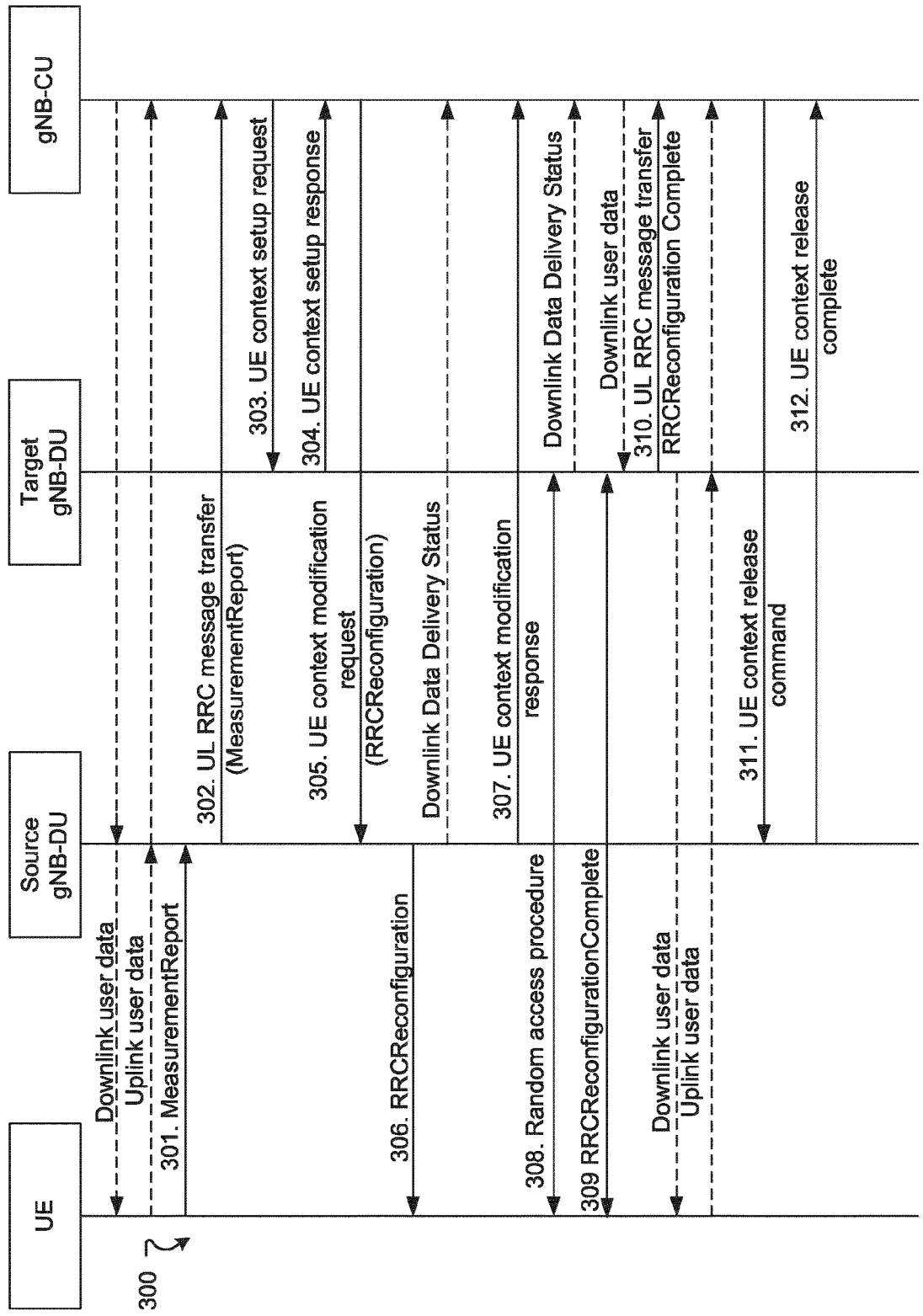
FIG. 3A is a sequence diagram illustrating inter-gNB-DU mobility signaling, according to an example implementation.
Figure 3B:
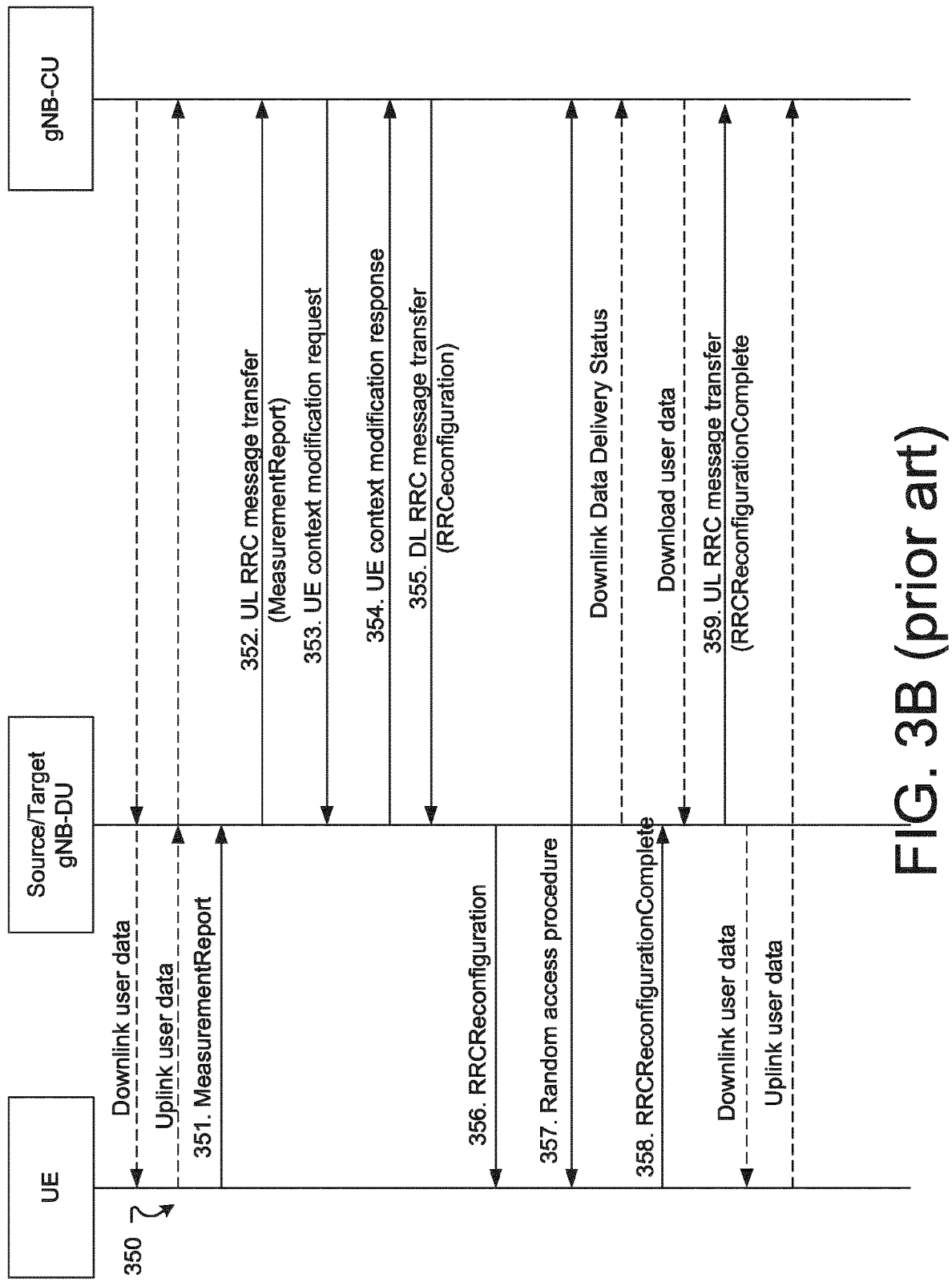
FIG. 3B is a sequence diagram illustrating intra-gNB-DU mobility signaling, according to an example implementation.

In such a disaggregated architecture as that shown in FIG. 2, a gNB-DU may host multiple cells up to a maximum of 512 according to current specifications. Accordingly, serving cell change between cells may be considered intra-DU for a serving cell change between cells of the same gNB-DU, and inter-DU between cells of different gNB-DUs. FIG. 3A illustrates an example of signaling for conventional intra-DU mobility 300; FIG. 3B illustrates an example of signaling for inter-DU mobility 350.

In conventional approaches to mobility events shown in FIGS. 3 and 4, a user equipment (UE) reports layer 1 (L1) and layer 3 (L3) measurements to the gNB-DU and gNB-CU, respectively. L1 beam measurements are reported to MAC layer and used for beam management in the gNB-DU, and are not forwarded to the gNB-CU. In contrast, L3 measurements (i.e., cell measurements including optional beam measurements) are reported using RRC protocol and used for mobility management. The L3 measurements are forwarded to the gNB-CU by the gNB-DU.

Beam changes are managed by DU and cell changes, regardless of whether the mobility is intra-DU or inter-DU, are traditionally (conventionally) triggered/managed by the gNB-CU-CP.

In conventional approaches to intra and inter gNB-DU mobility, the gNB-CU-CP determines the triggering of mobility procedure based on received L3 measurements. For intra-DU cell changes, this incurs additional time, particularly in a distributed cloud deployment where there is an external F1/E1 interface. For instance after UE sends the measurement report at 301 of FIG. 3A, the measurements have to be forwarded to the CU-CP (302) which will then request and perform the UE context modification at the target cell which belongs to the same DU (303 and 304), and send an RRCReconfiguration (serving cell change command) to the UE via the DU (305). Only at 306, DU is able to forward the serving cell change command to the UE.

In contrast to the above-described conventional approaches to intra and inter gNB-DU mobility, improved techniques of intra and inter gNB-DU mobility include determining, by a UE served by a source cell, whether a target cell belongs to the same gNB-DU as the source cell based on information sent by the gNB-CU-CP after a connection with the gNB has been established. The information sent by the gNB includes, for each cell, a group identifier identifying the gNB-DU with which that cell is associated. When measurement data provided by the UE indicates readiness for a serving cell change to a target cell, the UE uses the group identifier to determine whether the target cell belongs to the same gNB-DU as the source cell (intra-DU mobility scenario) or a different gNB-DU as the source cell (inter-DU mobility scenario).

Advantageously, the above-described improved technique for intra and inter gNB-DU mobility provides for more efficient serving cell change between cells belonging to the same gNB-DU. The gNB-CU is not burdened with intra-DU mobility and accordingly is saved those computing resources.

According to example implementation, the serving cell change effected by the apparatus is a handover, SCell change or establishment of dual- or multi-connectivity operation.

FIG. 4 is a table 400 illustrating an association of DU-PCI (physical cell identity, which may be referred to as PCI) with CU-PCIG (physical cell group identifier, which may be referred to as PCIG). The table 400 has columns corresponding to a gNB-DU identifier, a DU-PCI (physical cell identity) which identifies a cell, and a CU-PCIG (physical cell group identifier) which identifies a group of cells belonging to a gNB-DU. The table 400, then, enables the UE and/or a gNB-DU to identify a cell with a gNB-DU. This in turn enables the gNB to save computational resources by tasking the gNB-DU to handle intra-gNB-DU mobility. For example, when a UE is being served by a source cell having a DU-PCI of 2 and RSRP measurements indicate a serving cell change event to the target cell having a DU-PCI of 4, the UE will only communicate with its gNB-DU, and not the gNB-CU, to effect the serving cell change. If, in contrast, the target cell has a DU-PCI of 5, then table 400 indicates that the serving cell change will be inter-DU and handled by the gNB-CU. Note that, in intra-DU mobility, the gNB-CU is never notified of a serving cell change taking place between cells.

The result of the above-described split of intra-DU and inter-DU mobility is referred to as "bi-layered mobility." In summary:
  Mobility events for a target cell in the same gNB-DU as the source cell are triggered/handled at the gNB-DU, and
  Mobility events for a target cell in a different gNB-DU from the source cell are triggered/handled at the gNB-CU-CP.

Accordingly, the intra-gNB-DU (i.e. source and target cell are in the same gNB-DU) cell/beam changes are kept completely transparent to a gNB-CU control plane (gNB-CU-CP).

To Sum:
  The DU-PCIs of a given gNB-DU are associated (i.e., grouped) under a common PCI per DU, which is called CU-PCIG.
  The cell DU-PCI determines the UE presence at cell level, while the CU-PCIG determines the UE presence at DU level.
  The DU-PCI is allocated by the DU and any conflict is resolved by the CU-CP.

Figure 5:
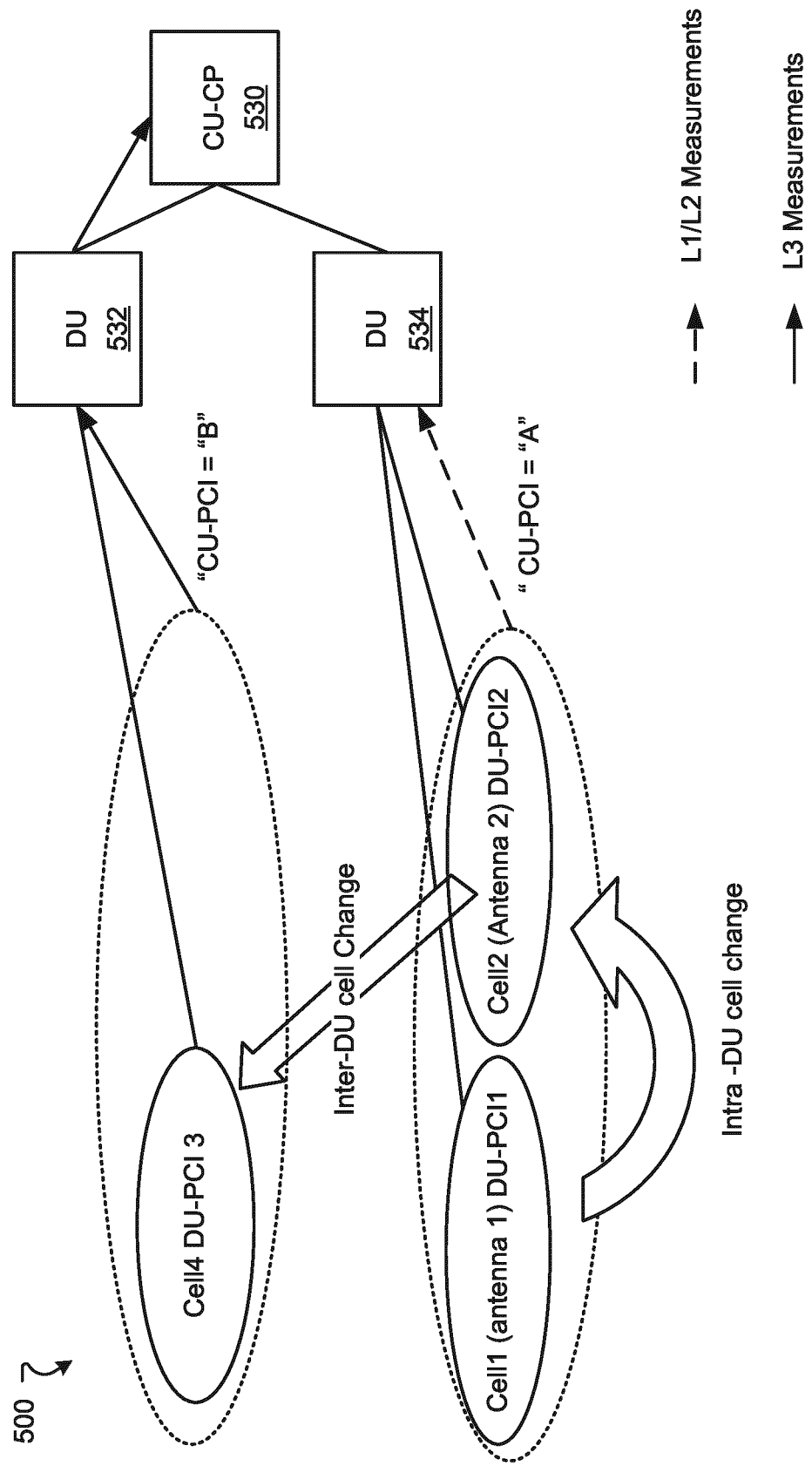
FIG. 5 is a diagram illustrating cell change in a bi-layered mobility structure according to an example implementation.

FIG. 5 is a diagram illustrating cell change in a bi-layered mobility structure 500. As shown in FIG. 5, the structure 500 includes a network node having a gNB-CU-CP 530 with which gNB-DUs 532 and 534 are associated. Cell4, having a DU-PCI of 3, is associated with gNB-DU 532 having a CU-PCIG "B,", and Cell1 and Cell2, with respective DU-PCIs of 1 and 2, are associated with gNB-DU 534 having a CU-PCIG of "A."

As shown in FIG. 5, when there is an intra-DU cell change, i.e., between Cell1 and Cell2, the UE served by the source cell (e.g., Cell2) sends layer 1 (L1) measurements to its gNB-DU, i.e., gNB-DU 534, as both Cell1 and Cell2 have a CU-PCI of "A." In contrast, when the target cell is Cell4, having a CU-PCI of "B" and associated with gNB-DU 532, the UE sends layer 3 (L3) measurements to the gNB-CU-CP via its gNB-DU.

Figure 6:
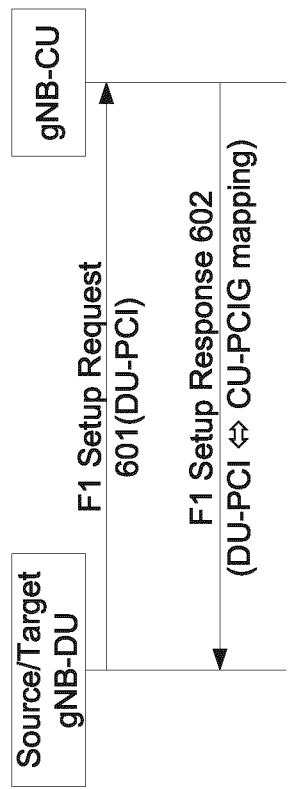
FIG. 6 is a sequence diagram illustrating an initial mapping exchange during F1 setup according to an example implementation.

FIG. 6 is a sequence diagram illustrating an initial mapping exchange 600 during F1 setup. At 601, the gNB-DU informs the gNB-CU-CP of its constituent cell DU-PCIs during the F1 setup. In some implementations, the gNB-DU may send the DU-PCIs during configuration update procedures. At 602, the gNB-DU in return receives the mapped CU-PCIG (i.e., CU-PCI) from the gNB-CU-CP.

Figure 7:
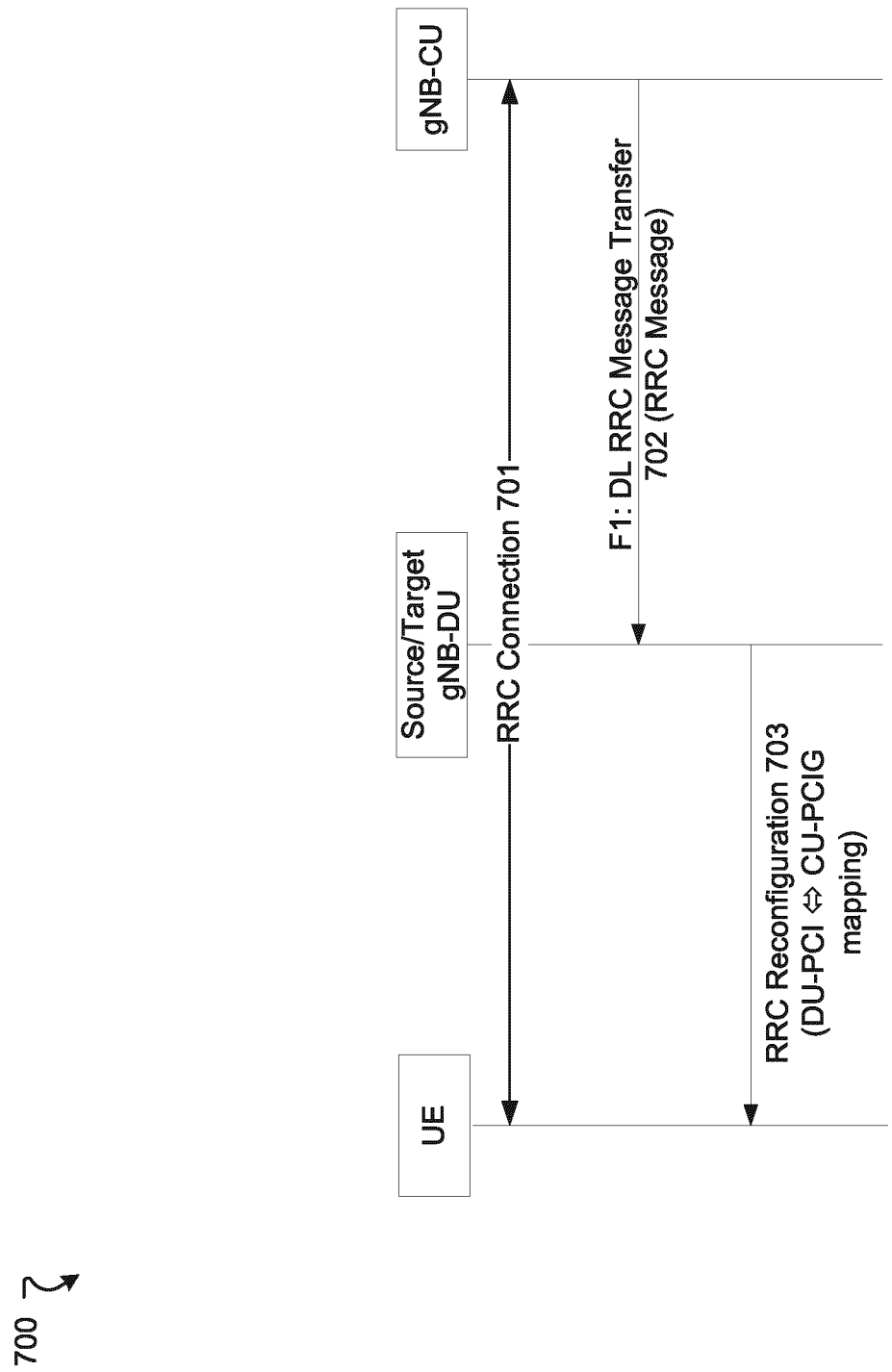
FIG. 7 is a sequence diagram illustrating a configuration of a mapping to a UE according to an example implementation.

FIG. 7 is a sequence diagram illustrating a configuration 700 of a mapping to a UE. At 701, a RRC connection between the UE and the gNB-CU is established. At 702, the gNB-CU sends a DL RRC message to each of the source and target gNB-DUs containing the mapping (e.g., table 400 of FIG. 4). At 703, the source gNB-DU sends an RRC Reconfiguration message containing the mapping to the UE.

Figure 8:
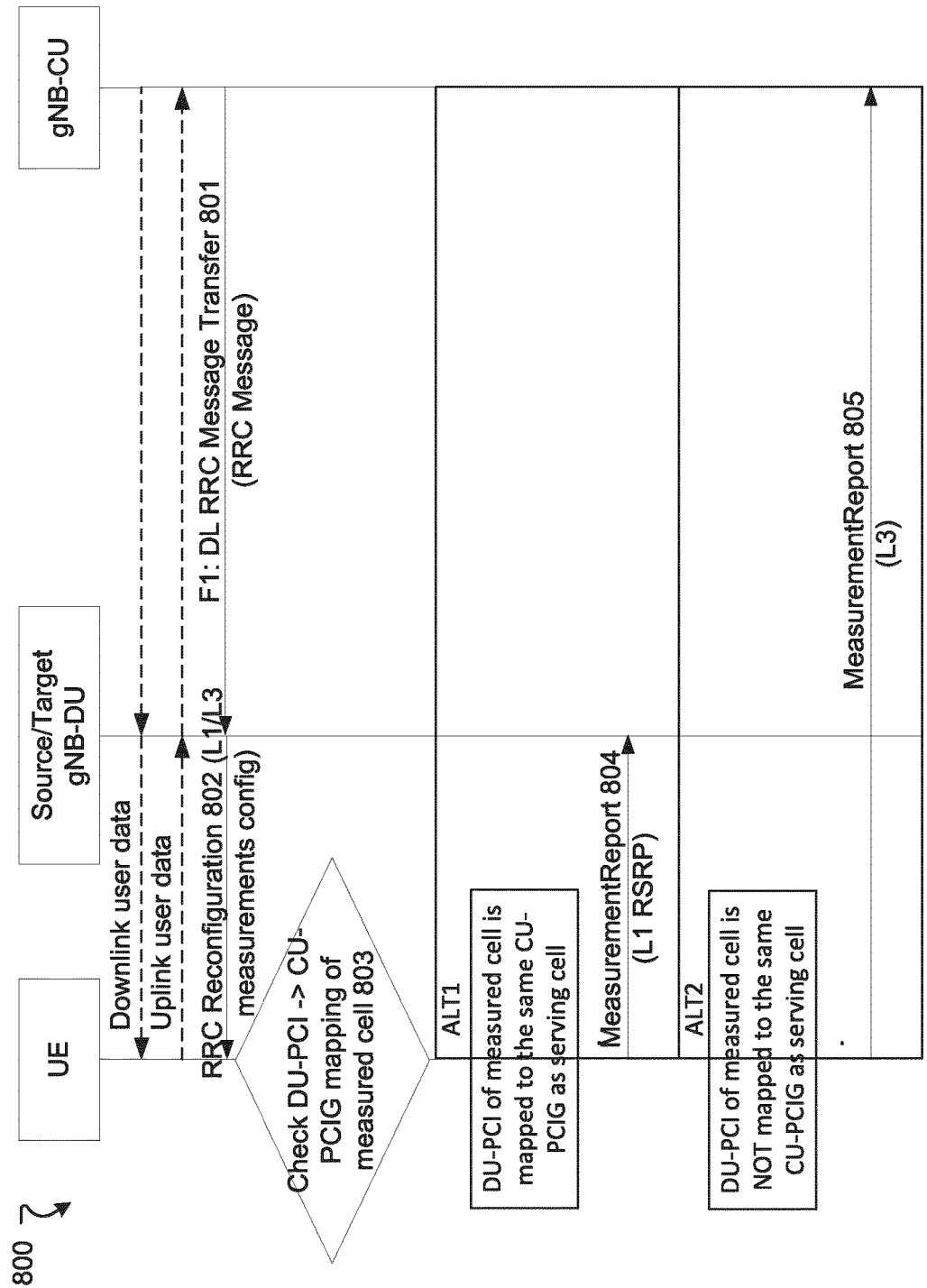
FIG. 8 is a sequence diagram illustrating a measurement configuration and reporting according to an example implementation.

FIG. 8 is a sequence diagram illustrating a measurement configuration and reporting 800 according to an example implementation. As shown in FIG. 8, DL user data flows from the gNB-CU to the source gNB-DU to the UE, while UL user data flows from the UE to the source gNB-DU to the gNB-CU. The UE is served by a source cell associated with the source gNB-DU.

At 801, the gNB-CU sends a DL RRC message to the source gNB-DU containing the mapping (e.g., table 400 of FIG. 4).

At 802, the gNB-DU sends a RRC Reconfiguration message based on the L1/L3 measurement configuration from the gNB-DU, the message including DU-PCI of a target cell.

At 803, the UE checks the mapping between the DU-PCI and the CU-PCIG of the target cell.

At 804, the DU-PCI of the target cell is mapped to the same CU-PCIG of the source cell. In this case, the UE sends a report of L1 measurements of a reference signal received power (RSRP) to the source gNB-DU. The gNB-CU is not involved in any serving cell change between the source and target cells.

At 805, the DU-PCI of the target cell is not mapped to the same CU-PCIG of the source cell. In this case, the UE sends a report of L3 measurements of the RSRP to the gNB-CU. The gNB-CU will manage the serving cell change between the source and target cells in this case.

Figure 9:
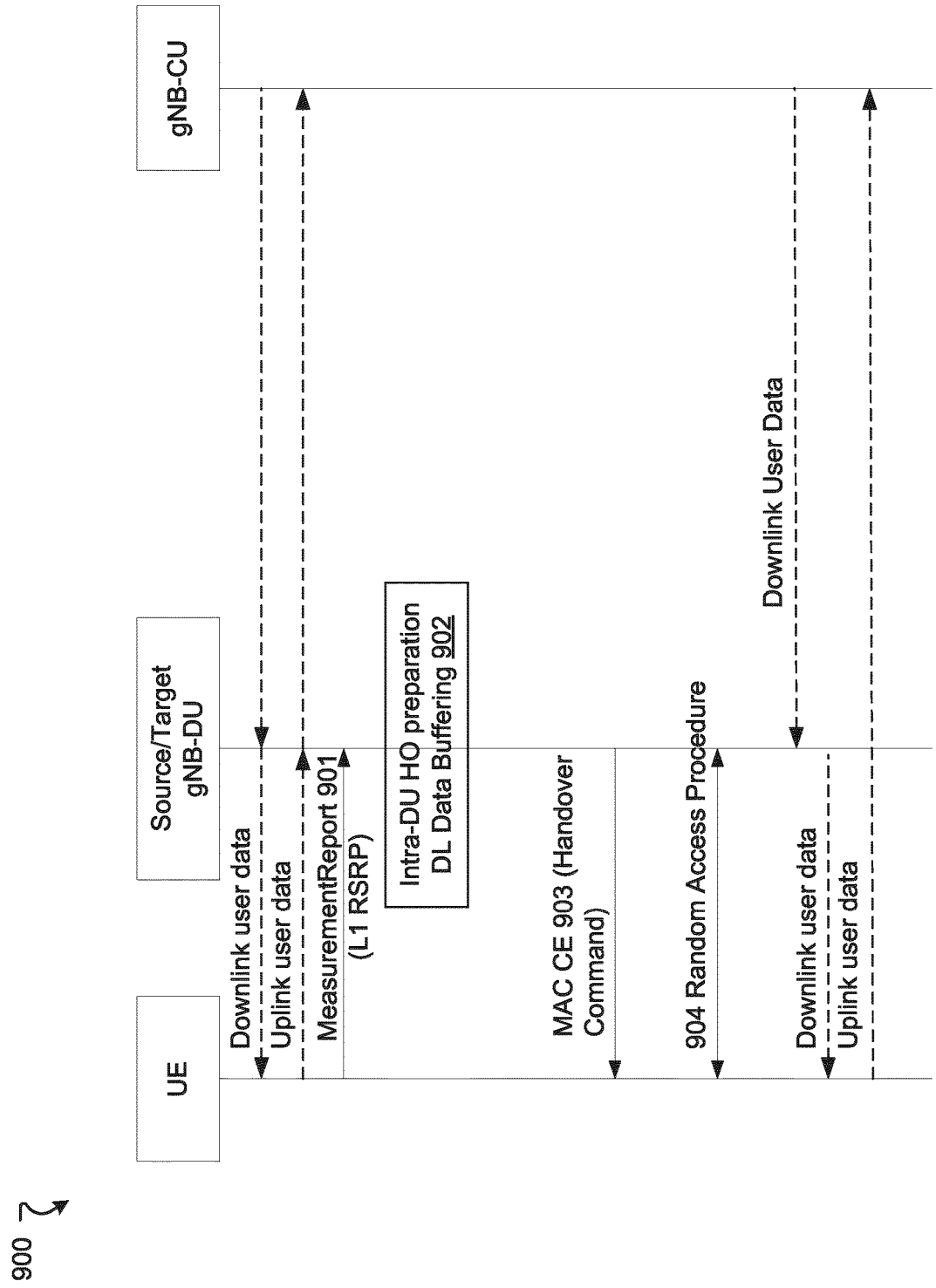
FIG. 9 is a sequence diagram illustrating an intra-DU mobility process according to an example implementation.

FIG. 9 is a sequence diagram illustrating an intra-DU mobility process according to an example implementation. As shown in FIG. 9, DL user data flows from the gNB-CU to the source gNB-DU to the UE, while UL user data flows from the UE to the source gNB-DU to the gNB-CU. The UE is served by a source cell associated with the source gNB-DU.

At 901, the UE sends a measurement report to its serving (source) gNB-DU; the report includes L1 RSRP measurements of a target cell having the same CU-PCIG as the source cell.

At 902, the serving gNB-DU performs an intra-DU preparation including DL data buffering.

At 903, the serving gNB-DU sends a serving cell change command to the UE over a MAC CE connection.

At 904, The UE and serving gNB-DU perform a random access (RACH) procedure to establish a connection between the UE and the gNB-DU within the target cell. Once the serving cell change has been effected, the gNB-CU sends DL user data to the serving gNB-DU, which in turn sends the DL user data to the UE in the target cell. (The gNB-CU does not know which cell by which the UE is served, only its serving gNB-DU.) The UE sends UL user data to the gNB-CU.

To summarize, the following entities within a network are affected as follows:

gNB-DU:
  gNB-DU informs the CU-CP of all its constituent Cell ID, cell DU-PCIs during F1 setup or Configuration update procedure. The gNB-DU in return receives the mapped CU-PCIG from the CU-CP.
  gNB-DU takes care of mapping the CU-PCIG=>DU-PCI while sending or receiving any messages to/from CU-CP gNB-CU-CP:
  The gNB-CU-CP sends this mapping between CU-PCIG⇔DU-PCI(s) during RRC Setup or Reconfiguration corresponding to Initial access/mobility/reconfiguration etc. scenarios to the UE via RRC protocol.
  The UE is always configured both L3 measurements and L1 RSRP measurements by RRC, since both are needed to handle the different mobility events.

UE:
  The UE receives the DU-PCI⇔CU-PCIG mapping from the gNB-CU-CP as part of the RRC configuration.
  The UE stores the DU-PCI⇔CU-PCIG mapping and based on this, when performing measurements.
    If the measured DU-PCI is mapped to the same CU-PCIG, L1 RSRP measurements (or possibly L3 RSRP measurements) are reported only to DU and the report to CU may be suppressed, which may lead to an intra-DU mobility event.
    If measured cell PCI is mapped to a different CU-PCIG, L3 measurements are reported to CU-CP which may lead to an inter-DU mobility event.
  It is noted that, after a measurement event is triggered and the concerned cell belongs to the same DU as serving cell, it is reported directly to DU (this would likely be done via L1/MAC and not RRC signalling. Moreover, L1 measurements on beams from another cell in the same DU may not be based on averaged measurements. When the concerned cell belongs to the same DU, L3 measurements may not be reported to CU. Even if they are reported, CU may not take any action towards UE based on them.
  The handling of different use-cases are as follows.

Initial Access
  UE performs initial access as currently using the cell DU-PCI.
  CU-CP allocates the CU-PCIG corresponding to the UE's cell PCI (shared with DU during F1 setup or Configuration Update procedures).
  CU-CP sends to UE during RRC Setup, the mapping between DU-PCIs and CU-PCIG.
  UE stores this until it is further updated during an inter-DU cell change.

Measurement Configuration and Reporting.
  UE is always configured both L3 measurements and L1 RSRP measurements by RRC.
  UE performs measurements as usual. When measuring a target Cell,
    if L1 RSRP measurements on the Target cell are reported at MAC protocol at the DU, the DU may trigger an intra-DU cell change.
    If target cell's DU-PCI has a different CU-PCIG, L3 measurements are reported to CU-CP.
    CU-CP may trigger an inter-DU serving cell change based on reported L3 measurements.

Figure 10:
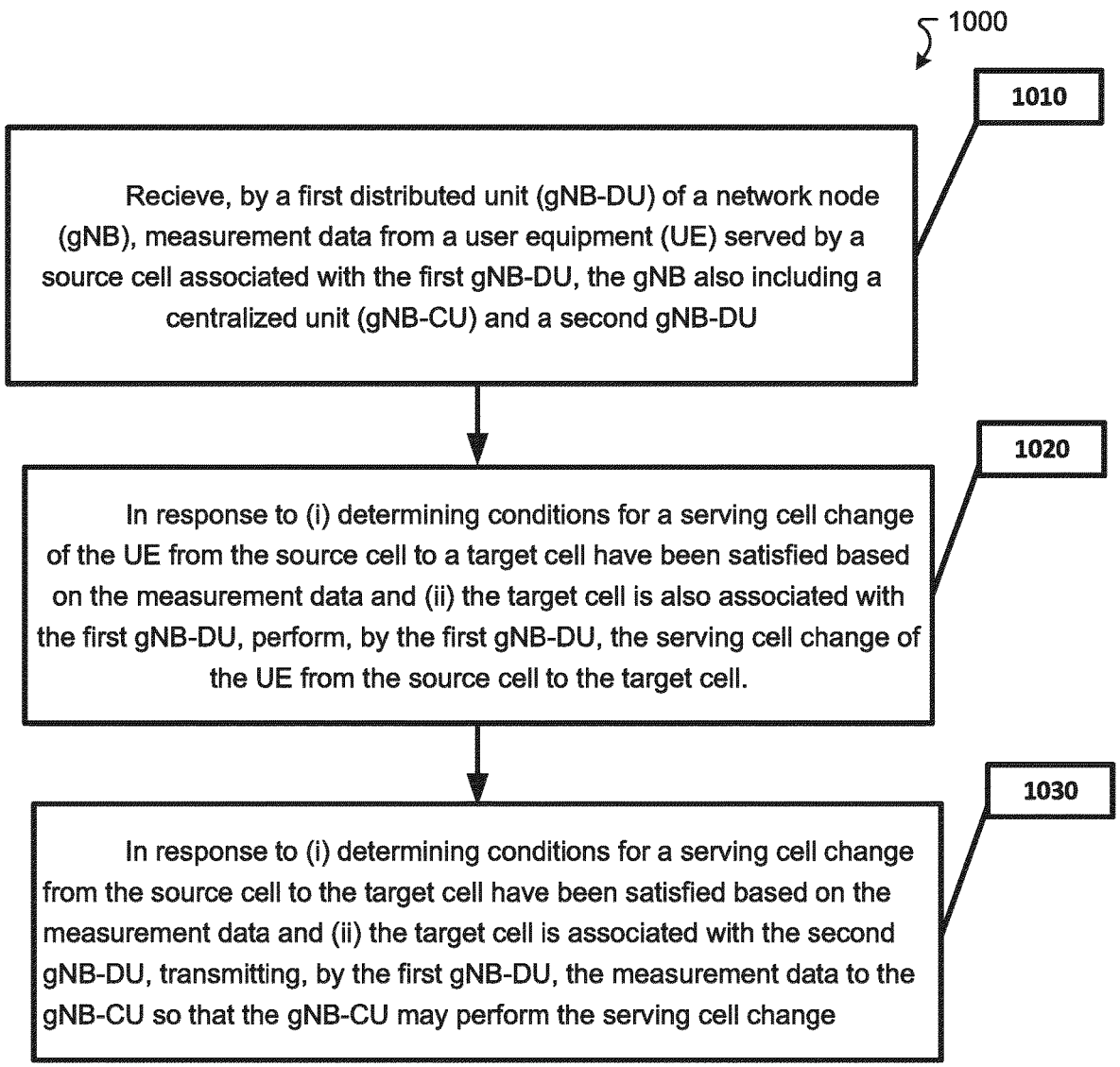
FIG. 10 is a flow chart illustrating a bi-layered mobility process according to an example implementation

Mobility
  As in current situations, all DU level parameters are controlled by DU and the CU-CP is kept agnostic of the cell level aspects.
  Likewise during any resource preparation for a Handover event Example 1-1: FIG. 10 is a flow chart illustrating an example method 1000 of performing intra and inter gNB-DU mobility. Operation 1010 includes receiving, by a first distributed unit (gNB-DU) of a network node (gNB), measurement data from a user equipment (UE) served by a source cell associated with the first gNB-DU, the gNB also including a centralized unit (gNB-CU) and a second gNB-DU. Operation 1020, includes in response to (i) determining conditions for a serving cell change of the UE from the source cell to a target cell have been satisfied based on the measurement data and (ii) the target cell is also associated with the first gNB-DU, performing, by the first gNB-DU, the serving cell change of the UE from the source cell to the target cell. Operation 1030, includes in response to (i) determining conditions for a serving cell change from the source cell to the target cell have been satisfied based on the measurement data and (ii) the target cell is associated with the second gNB-DU, transmitting, by the first gNB-DU, the measurement data to the gNB-CU so that the gNB-CU may perform the serving cell change.

Example 1-2: According to an example implementation of example 1-1, further comprising receiving, from the gNB-CU, mapping data representing a mapping between a plurality of physical cell identifiers (DU-PCIs) and a plurality of physical cell group identifiers (CU-PCIGs), each of the plurality of DU-PCIs identifying a respective cell of a plurality of cells associated with at least first and second gNB-DUs, each of the CU-PCIGs identifying a respective group of one or more cells from at least the first gNB-DU or the second gNB-DU, and determining whether the target cell is served by the first gNB-DU based on the mappings between (i) the DU-PCIs identifying the source cell and the target cell and (ii) the CU-PCIGs identifying the first gNB-DU and the second gNB-DU.

Example 1-3: According to an example implementation of example 1-2, further comprising transmitting, to the gNB-CU, cell data representing a plurality of DU-PCIs, and receiving, from the gNB-CU, the mapping data, the mapping data being based on the cell data.

Example 1-4: According to an example implementation of examples 1-2 and 1-3, wherein the mapping data is received during one of an F1 setup or a gNB-CU Configuration Update procedure.

Example 1-5: According to an example implementation of examples 1-1 to 1-4, wherein the measurement data includes L1 measurement data from layer 1 (L1) measurements of a reference signal received power (RSRP) and layer 3 (L3) measurement data from L3 measurements of the RSRP.

Example 1-6: According to an example implementation of examples 1-1 to 1-5, wherein the L1 measurement data is received via a MAC interface.

Example 1-7: According to an example implementation of examples 1-1 to 1-6, wherein, in response to the target cell being served by the second gNB-DU, transmit the L3 measurement data to the gNB-CU.

Example 1-8: According to an example implementation of example 1-7, wherein the L3 measurement data is transmitted to the gNB-CU via a radio resource control (RRC) connection.

Example 1-9: According to an example implementation of examples 1-5 to 1-8, wherein, in response to the target cell being served by the first gNB-DU, not transmit any portion of the measurement data to the gNB-CU.

Example 1-10: An apparatus comprising means for performing a method of any of examples 1-1 to 1-9.

Example 1-11: A computer program product including a non-transitory computer-readable storage medium and storing executable code that, when executed by at least one data processing apparatus, is configured to cause the at least one data processing apparatus to perform a method of any of examples 1-1 to 1-9.

Figure 11:
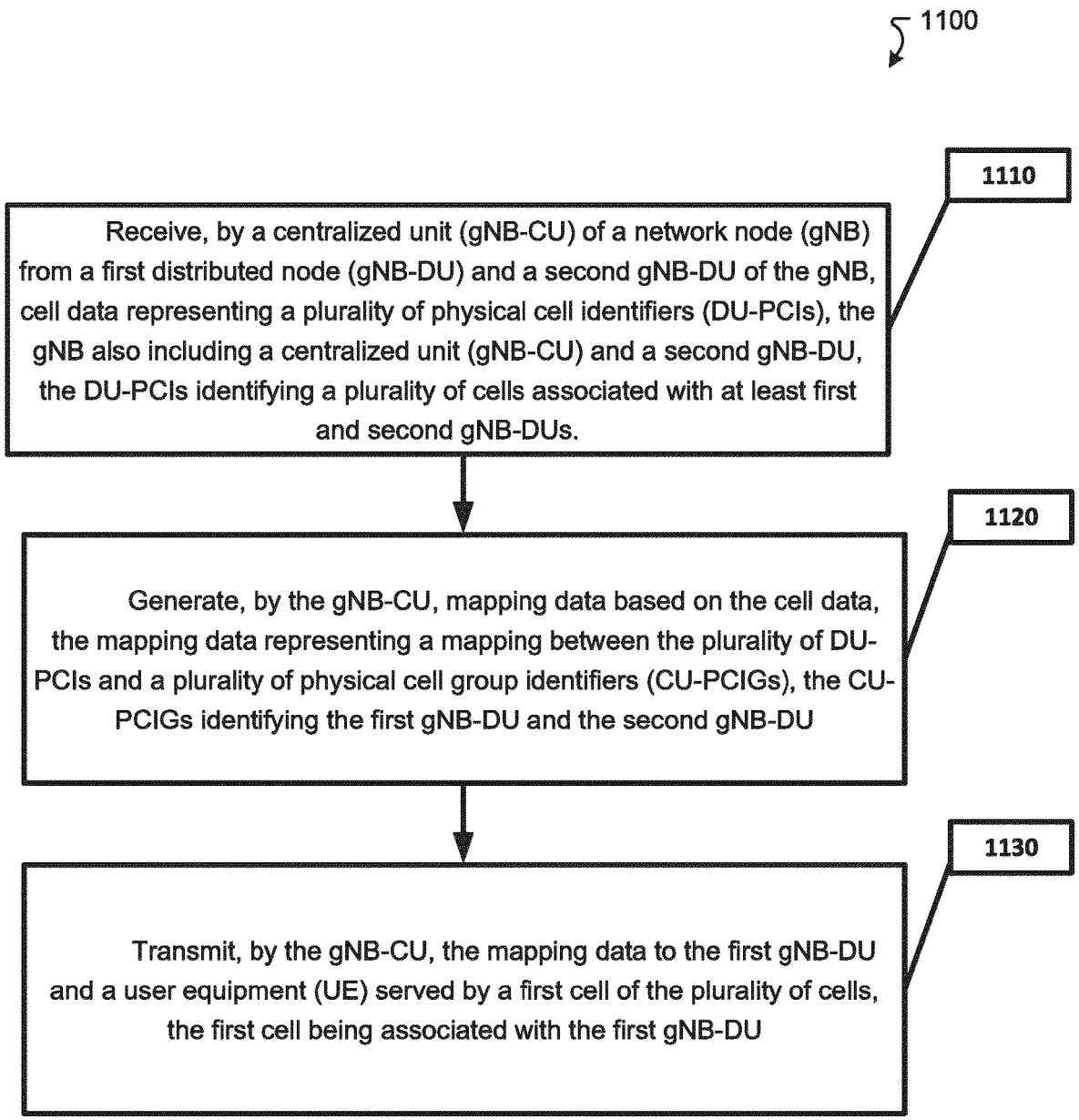
FIG. 11 is a flow chart illustrating a bi-layered mobility process according to an example implementation.

Example 2-1: FIG. 11 is a flow chart illustrating a process 1100 of performing intra and inter gNB-DU mobility. Operation 1110 includes receiving, by a centralized unit (gNB-CU) of a network node (gNB) from a first distributed node (gNB-DU) and a second gNB-DU of the gNB, cell data representing a plurality of physical cell identifiers (DU-PCIs), the gNB also including a centralized unit (gNB-CU) and a second gNB-DU, the DU-PCIs identifying a plurality of cells associated with at least first and second gNB-DUs. Operation 1120 includes generating, by the gNB-CU, mapping data based on the cell data, the mapping data representing a mapping between the plurality of DU-PCIs and a plurality of physical cell group identifiers (CU-PCIGs), the CU-PCIGs identifying the first gNB-DU and the second gNB-DU. Operation 1130 includes transmitting, by the gNB-CU, the mapping data to the first gNB-DU and a user equipment (UE) served by a first cell of the plurality of cells, the first cell being associated with the first gNB-DU.

Example 2-2: According to an example implementation of example 2-1, wherein the mapping data is transmitted to the UE during a radio resource control (RRC) reconfiguration.

Example 2-3: According to an example implementation of examples 2-1 or 2-2, wherein the mapping data is transmitted to the first gNB-DU during an F1 setup.

Example 2-4: An apparatus comprising means for performing a method of any of examples 2-1 to 2-3.

Example 2-5: A computer program product including a non-transitory computer-readable storage medium and storing executable code that, when executed by at least one data processing apparatus, is configured to cause the at least one data processing apparatus to perform a method of any of examples 2-1 to 2-3.

Figure 12:
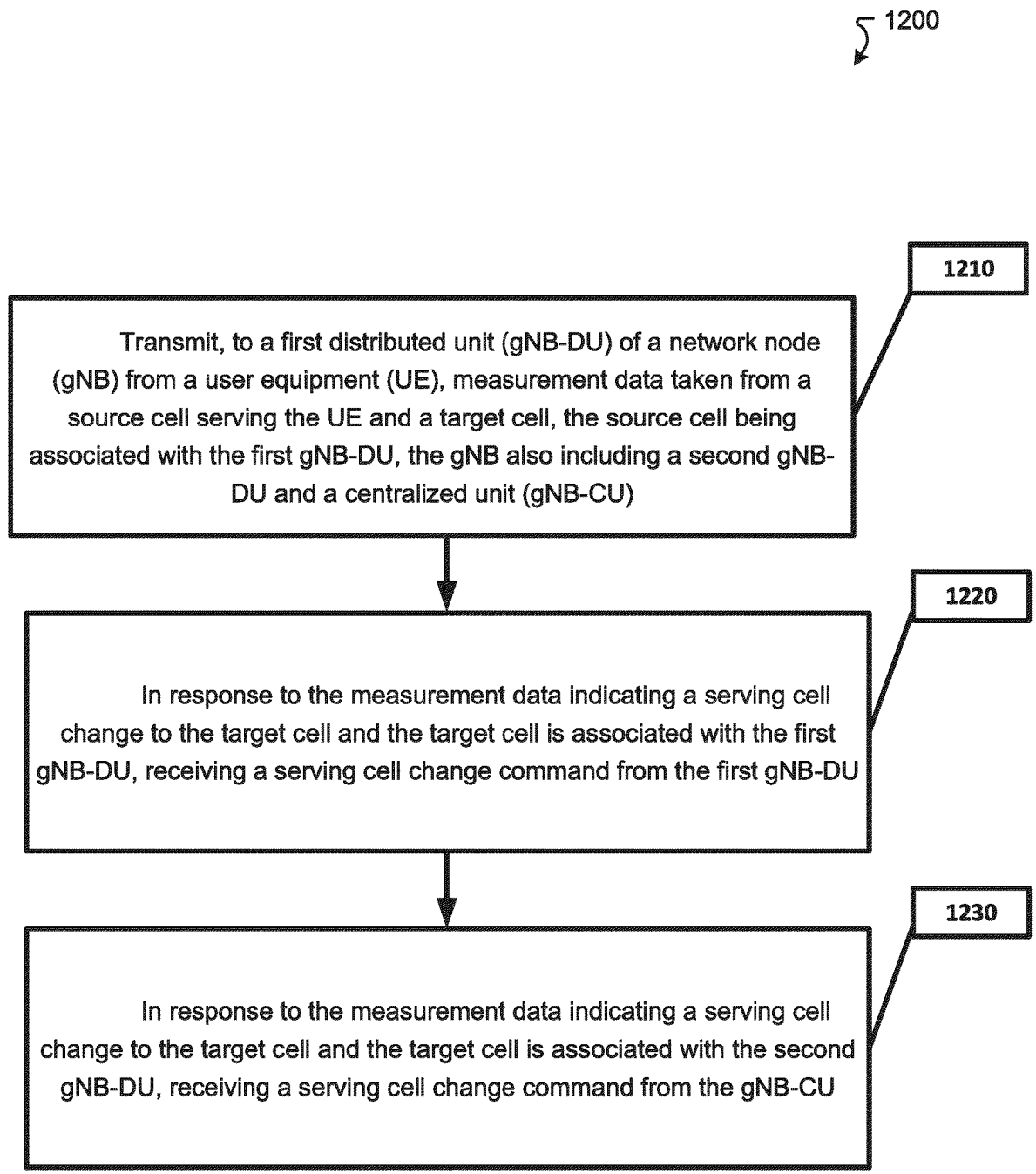
FIG. 12 is a flow chart illustrating a bi-layered mobility process according to an example implementation.

Example 3-1: FIG. 12 is a flow chart illustrating a process 1200 of performing intra and inter gNB-DU mobility. Operation 1210 includes transmitting, to a first distributed unit (gNB-DU) of a network node (gNB) from a user equipment (UE), measurement data taken from a source cell serving the UE and a target cell, the source cell being associated with the first gNB-DU, the gNB also including a second gNB-DU and a centralized unit (gNB-CU). Operation 1220 includes, in response to the measurement data indicating a serving cell change to the target cell and the target cell is associated with the first gNB-DU, receiving a serving cell change command from the first gNB-DU. Operation 1230 includes, in response to the measurement data indicating a serving cell change to the target cell and the target cell is associated with the second gNB-DU, receiving a serving cell change command from the gNB-CU.

Example 3-2: According to an example implementation of example 3-1, further comprising receiving, from the gNB-CU, mapping data representing a mapping between a plurality of physical cell identifiers (DU-PCIs) and a plurality of physical cell group identifiers (CU-PCIGs), each of the plurality of DU-PCIs identifying a respective cell of a plurality of cells associated with at least first and second gNB-DUs, each of the CU-PCIGs identifying a respective group of one or more cells from at least the first gNB-DU or the second gNB-DU.

Example 3-3: According to an example implementation of example 3-2, wherein the mapping data is received during a radio resource control (RRC) reconfiguration.

Example 3-4: According to an example implementation of examples 3-1 to 3-3, wherein the measurement data includes L1 measurement data from layer 1 (L1) measurements of a reference signal received power (RSRP) and layer 3 (L3) measurement data from L3 measurements of the RSRP.

Example 3-5: According to an example implementation of example 3-4, wherein transmitting the measurement data includes, in response to the measurement data indicating a serving cell change to the target cell and the target cell is associated with the first gNB-DU, transmit the L1 measurement data to the first gNB-DU via a media access control (MAC) interface.

Example 3-6: According to an example implementation of example 3-4, wherein transmitting the measurement data includes, in response to the measurement data indicating a serving cell change to the target cell and the target cell is associated with the second gNB-DU transmit the L3 measurement data to the gNB-CU via a radio resource control (RRC) reconfiguration.

Example 3-7: An apparatus comprising means for performing a method of any of examples 3-1 to 3-6.

Example 3-8: A computer program product including a non-transitory computer-readable storage medium and storing executable code that, when executed by at least one data processing apparatus, is configured to cause the at least one data processing apparatus to perform a method of any of examples 3-1 to 3-6.

In summary:
CU-CP maybe notified of the UE's serving cell whenever gNB-DU executes L1/L2 centric mobility.
The DU maintains and performs the mapping between DU-PCI and CU-PCIG towards the CU-CP and the UE.
Paging also works on a similar basis. CU-CP simply pages the gNB-DU and gNB-DU pages the UE in serving and assisting cell(s).
Data is sent to the UE via gNB-DU. gNB-DU in charge of routing to the right cell using the correct cell-PCI.
  Data tunnels over F1-U do not change during an intra-DU cell change.
During Intra DU Handover: DRB are retained,
  no change of ciphering key,
  continuity of SRBs,
  PDCP and RLC buffers are not flushed and continue the transmission and reception,
  RLC layer would re-send the lost packet in case of AM mode DRB.
C-RNTI application and usage remains unchanged (e.g. even if the L1/L2-centric mobility introduces multiple C-RNTIs, the L1/L2 centric mobility doesn't alter their usage).
Serving cell definition: the UE still retains the same serving cell as before (with the DU-PCI defining the serving cell). There may be impacts to which events can be configured for this case (as the "serving cell" may not be the only cell that is needed for measurement event comparisons), but they are outside this IR.
RLF monitoring: As the UE retains the existing serving cell, RLF monitoring would follow the serving cell.

Further example embodiments will now be described, with reference to, e.g., FIGS. 13-20, which may, in some cases, incorporate or include one or more features or operations described above.

Figure 13:
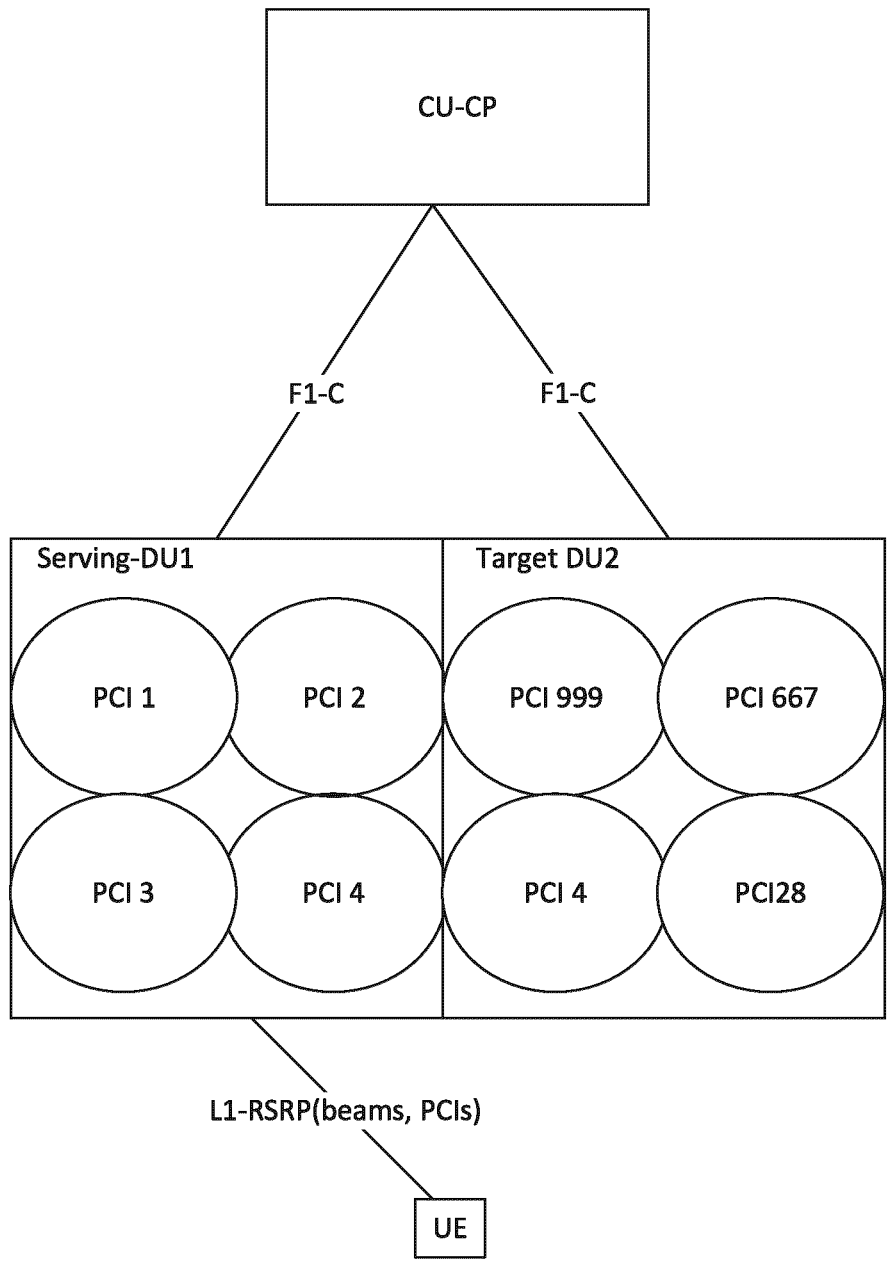
FIG. 13 is a diagram illustrating a physical cell identity (PCI) conflict (or PCI collision) according to an illustrative example.

FIG. 13 is a diagram illustrating a physical cell identity (PCI) conflict (or collision) according to an illustrative example embodiment. In this illustrative example, a CU-CP is connected to (and/or controls) multiple DUs (distributed units), including DU1 and DU2. A UE (user equipment) may be connected to a serving cell provided by serving DU1. UE may provide a layer 1 (L1) measurement report to serving DU1, where the measurement report may include or identify one or more (best) beams, measurement data (e.g., reference signal received power/RSRP of such beams and/or any other measurement data), for one or more cells (identified by providing a PCI for each of the indicated beams). A L1 measurement report may typically be sent, e.g., from MAC (Media Access Control) entity of UE to MAC entity of DU, and may, for example, be used for beam management. PCIs are assigned to cells by each DU (not by the CU). Although there are methods to resolve PCI conflict during PCI allocation and F1 setup between CU and DU, PCI conflict cannot be completely avoided. For example, there may be only 1024 PCIs, while there may be a maximum (for example) of 16384 cells (2 power 14) within a network or RAN, or portion thereof. Thus, it is very possible, and even likely, that the UE may be requested by the CU and/or serving DU to measure cells (provided by different DUs) with conflicting (the same) PCIs, and/or the UE may send a measurement report with measurement data for cells with conflicting PCIs.

Thus, with respect to FIG. 13, two DUs, one serving DU1 and one target DU2 are controlled by the same CU-CP. Serving DU1 controls 4 cells with PCI 1, 2, 3, and 4 and target DU2 controls 4 cells with PCI 4, 28, 999 and 1667. Herein, we have two cells having the same PCI that are controlled by different DUs. Thus, FIG. 13 illustrates an example of a possible PCI collision or conflict. For example, in this case, the UE may send a L1 measurement report intended for L1/L2 mobility, in which the UE may report beam ID, corresponding L1-RSRP or L1-SINR measurements and their respective PCI to the serving DU (e.g., DU1). For example, the measurement report may indicate beams 2, 3 have RSRP xx and belong to PCI4. Since L1/L2 mobility is executed at DU, the serving DU (DU1 in this example) needs to disambiguate if the PCI4 reported in L1-RSRP measurements belongs to own DU or a different (e.g., neighboring) DU. Thus, the DU needs to determine (on its own, or be notified by the UE) whether a measured cell is intra-DU with respect to the serving cell (wherein both serving cell and measured cell are associated with or controlled by the same DU (DU1)), or the measured cell is inter-DU with respect to the serving cell (wherein the measured cell is associated with (e.g., controlled by) a DU (e.g., DU2 in FIG. 13) that is different than the DU (e.g., DU1 in FIG. 13) associated with the serving cell. For example, the serving DU may perform different actions and/or send different messages, depending on whether the measured cell (e.g., in which measurement data for the measured cell may satisfy a handover condition) is intra-DU or inter-DU with respect to the serving cell. Currently, this is not possible.

Techniques are described herein to allow the UE to determine or detect a PCI conflict for a measured cell, and then notify a DU (e.g., DU1) associated with the serving cell whether the measured cell is inter-DU or intra-DU. Three example embodiments are described below, shown in FIGS. 14, 15 and 16, respectively.

A layer 1 (L1) measurement report may, for example, may include reference signal measurements for one or more beams, and may, for example, be used for beam management. A L1 measurement report may sometimes include less processing (e.g., such as filtering of measurement samples) than a L3 measurement report. A L1 measurement report may typically be sent from a L1 or L2 protocol entity (e.g., media access control entity) of the UE to a peer L1 or L2 protocol entity of a serving DU, and is not typically sent to the CU. For example, a L1 measurement report may be sent from a MAC entity (e.g., within a MAC message or within a MAC control element) of the UE to a MAC entity of the serving DU. Thus, a L1 measurement report is typically provided by the UE only to the serving cell and serving DU, and is not typically shared with (or forwarded to) the CU that controls the serving DU. The L1 measurement report may typically be sent by the UE L1 protocol entity (e.g., by the UE MAC entity) to peer L1 protocol entity (e.g., MAC entity) of DU. On the other hand, a layer 3 measurement report may sometimes include further processing of (e.g., reference signal) measurement samples of a cell, and the L3 measurement report may typically be sent by the L3 (e.g., radio resource control (RRC)) protocol entity of the UE to a peer L3 protocol entity of the CU that controls the serving DU (e.g., DU1). Thus, for example, a L3 measurement report may be sent within a RRC message from the RRC entity of the UE to a peer RRC entity of the CU. Also, for example, a L1 or L2 control message may include a MAC message or MAC control element that may be sent between UE and DU, while a L3 control message may include a RRC message sent between the UE and CU.

Figure 14:
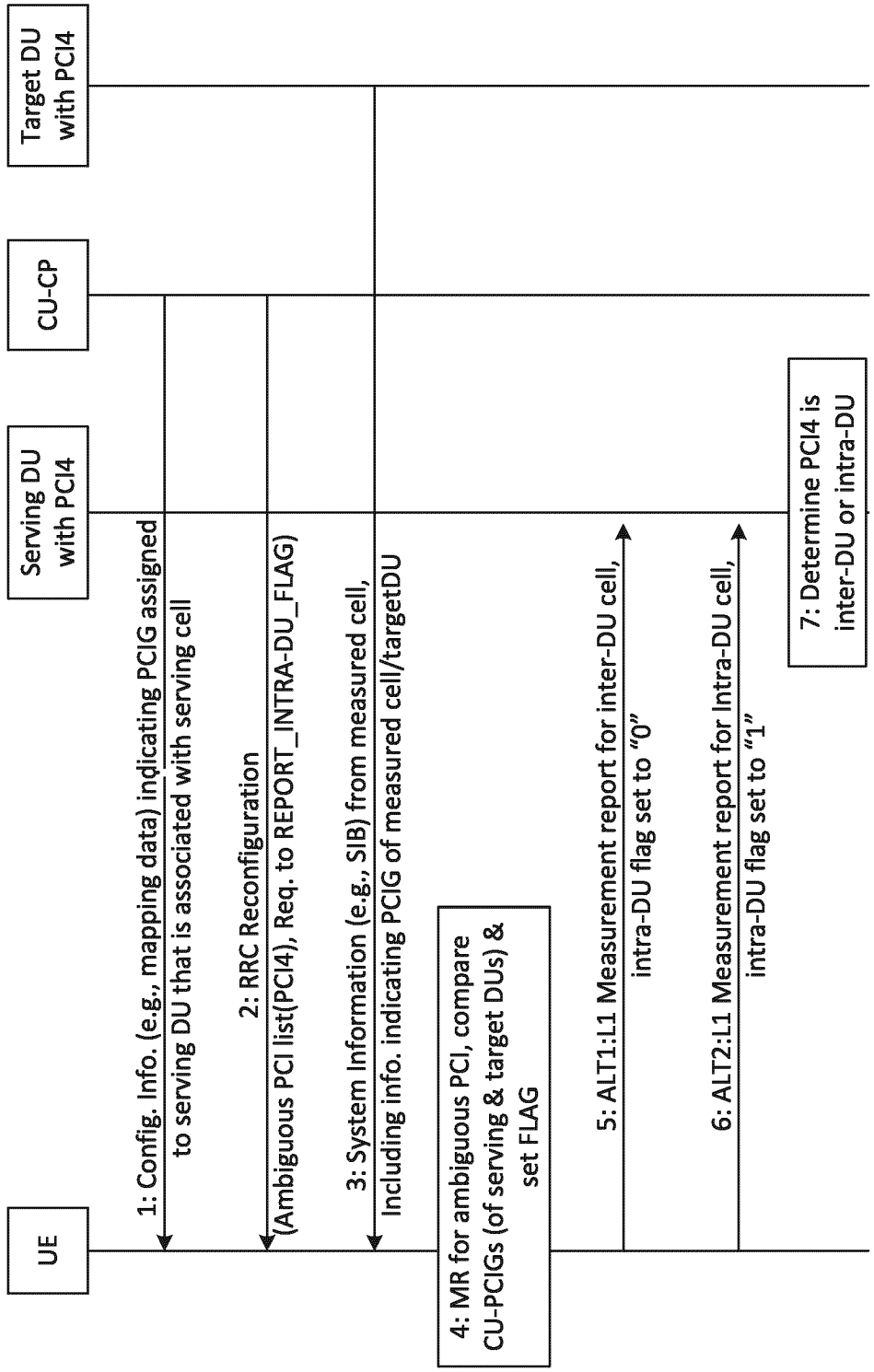
FIG. 14 is a signal diagram illustrating operation of a system according to an example embodiment.

FIG. 14 is a signal diagram illustrating operation of a system according to an example embodiment. At step 1, the CU may provide configuration information (e.g., via a RRC message, or other message or signal, which may be provided to the UE at attachment, for example) to the UE, which may include or indicate a PCIG assigned to the DU (e.g., DU1 in FIG. 13) associated with the serving cell for the UE. For example, this configuration information may be provided to the UE as mapping data (e.g., see FIG. 4 as an example) that may represent a mapping (or association) between a PCI of the serving cell and the PCIG of the DU associated with the serving cell (e.g., DU1 in FIG. 13). This is an example of how the UE may determine the PCIG of the serving cell. Alternatively, the UE may obtain or learn the PCIG of the serving cell by receiving SIB from the serving cell, which may indicate the PCIG of the serving cell (PCIG assigned to the DU that controls the serving cell).

At step 2 of FIG. 14, the CU sends a RRC reconfiguration message to the UE via a serving cell of the UE (where the serving cell is associated with a first DU, e.g., DU1). The RRC reconfiguration message may include, for example, a list of conflicting PCIs and a request or command for the UE to provide (e.g., to the DU associated with the serving cell, e.g., DU1 or first DU) an indication of whether a measured cell is intra-DU or inter-DU with respect to the serving cell. Each DU may be assigned by the CU, a unique PCIG, and a set of cells are associated with each DU (e.g., controlled by each DU). For example, a flag or 1-bit indicator (e.g., intra-DU flag) may be used by the UE to report to the DU whether a measured cell is intra-DU or inter-DU with respect to the serving cell. The information sent via steps 1 and 2 may be sent via a single RRC message, or may be sent via multiple RRC messages, for example.

At step 3 of FIG. 14, the UE may receive from a measured cell, system information (e.g., SIB), or other information, which may include information indicating a PCIG of the measured cell (e.g., the PCIG of the DU that controls the measured cell. Note, that the SIB/system information received by the UE from a measured cell may include or indicate either: 1) a PCIG that is assigned to the same DU that is associated with the serving cell (a same PCIG as serving DU (e.g., DU1 in FIG. 13), indicating intra-DU for the measured cell with respect to the serving cell); or 2) the SIB/system information received from the measured cell may include or indicate a PCIG that is assigned to a different DU (e.g., DU2) than the serving DU (e.g., DU1) or the DU that is associated with the serving cell (DU associated with measured cell is assigned a different PCIG than serving DU, indicating inter-DU for measured cell with respect to serving cell).

At step 4 of FIG. 14, the UE may compare the PCIG of the measured cell to the PCIG of the serving cell, to determine whether: the measured cell (e.g., which may have a conflicting PCI) is intra-distributed unit (intra-DU) with respect to the serving cell, or is inter-distributed unit (inter-DU) with respect to the serving cell.

Based on the comparison of step 4, the UE may then send one of two alternative measurement reports, at steps 5 or 6, which include different values of the flag (e.g., intra-DU flag). At steps 5 or 6, the UE sends a L1 measurement report to the DU associated with the serving cell (e.g., measurement report is sent from MAC entity of UE to MAC entity of DU1 that controls serving cell for UE), wherein the L1 measurement report may include measurement data (e.g., RSRP measurement value and/or PCI of measured cell, and/or whether a signal measurement (e.g., RSRP) of measured cell satisfies a handover condition, and/or other measurement data) for the measured cell and information (e.g., intra-DU flag) indicating whether the measured cell is intra-DU or inter-DU with respect to the serving cell.

The measurement reports at steps 5 and 6 of FIG. 14 may be the same or similar, except the value of the flag, depending on the comparison at step 4. As noted, the UE may send only one of the reports to the DU (depending on whether the measured cell is intra-DU or inter-DU), at either step 5 or step 6. At step 5 (if the UE determines that the measured cell is inter-DU at step 4), the UE sends the measurement report, including measurement data for the measured cell and the flag (e.g., intra-DU flag) set to "0" to indicate that the measured cell is inter-DU with respect to the serving cell. At step 6 (if the UE determines that the measured cell is intra-DU at step 4), the UE sends the measurement report, including measurement data for the measured cell and the flag (e.g., intra-DU flag) set to "1" to indicate that the measured cell is intra-DU with respect to the serving cell.

At step 7 of FIG. 14, the serving DU (e.g., DU1 in FIG. 13) determines that PCI4 (the conflicting PCI) is intra-DU or inter-DU, based on the received flag.

For example, conflicting physical cell identities (PCIs) indicate that a same PCI has been assigned to different cells associated with different DUs. Also, a measured cell being intra-DU with respect to the serving cell of the UE indicates that the measured cell is associated with a first distributed unit (e.g., DU1, FIG. 13, serving the UE) that is also associated with the serving cell (that is, PCIG of DU associated with serving cell is same as PCIG of DU associated with measured cell, which means both serving cell and measured cell are controlled by same DU (DU1 in this example)); and wherein a measured cell being inter-DU with respect to the serving cell of the UE indicates that the measured cell is associated with a second distributed unit (e.g., DU2, FIG. 13) that is different than the first distributed unit (e.g., DU1) (that is, PCIG of DU (e.g., DU1) associated with serving cell is different than the PCIG of DU (e.g., DU2) associated with measured cell, thus indicating that the measured cell is inter-DU with respect to the serving cell).

With respect to FIG. 14, the comparing may include, e.g., comparing, by the UE, the PCIG of the measured cell to the PCIG of the serving cell, to determine whether: the measured cell is intra-DU with respect to the serving cell based on the PCIG of the measured cell being the same as the PCIG of the serving cell; or the measured cell is inter-DU based on the PCIG of the measured cell being different than the PCIG of the serving cell.

As noted, the UE may receive system information from one or more cells that are configured for the UE to measure, in order to obtain a PCIG for each of these cells. However, receiving system information for each of the measured cells in order to obtain the PCIG for each measured cell may consume additional time and significant resources of the UE. Thus, in order to improve efficiency, the UE may (at least in some cases) receive or read system information to obtain or determine PCIG of only those measured cells that have a conflicting PCI (e.g., as indicated to the UE in the ambiguous PCI list provided to the UE from the CU in step 2 of FIG. 14). In this manner, the UE may improve operational efficiency by receiving system information only for those measured cells that have a conflicting (or colliding) PCI, as reported to the UE from the CU. Thus, the method of FIG. 14 may further include receiving, by the UE, system information from cells having a PCI listed in the list of conflicting physical cell identities (e.g., listed in the ambiguous PCI list of step 2), to obtain a PCIGs for cells having PCIs listed in the list of conflicting physical cell identities, while omitting to obtain a PCIG for cells having PCIs that are not listed in the list of conflicting physical cell identities.

The CU, serving DU and/or UE may perform further actions, depending on whether the measured cell is inter-DU or intra-DU.

For example, the UE may receive from a first DU (e.g., DU1 in FIG. 13) associated with the serving cell via layer 1 (L1) or layer 2 (L2) control message (e.g., MAC message or MAC control element), an intra-DU handover request to instruct the UE to perform a handover or cell change from the serving cell to the measured cell if measurement data of the measured cell satisfies a handover condition and the measured cell is intra-DU with respect to the serving cell.

Also, for example, the UE may receive from the first DU (e.g., DU1 in FIG. 13) associated with the serving cell via layer 1 (L1) or layer 2 (L2) control message (e.g., MAC message or MAC control element), an inter-DU handover request to instruct the UE to perform a handover or cell change from the serving cell to the measured cell if the measurement data of the measured cell satisfies a handover condition and the measured cell is inter-DU with respect to the serving cell. Thus, the serving DU (e.g., DU1, associated with or controlling the serving cell of the UE) may send the UE a handover (HO) command, for either an intra-DU cell change/HO to the measured cell (e.g., if measured cell is intra-DU), or for an inter-DU cell change/HO to the measured cell (by providing different HO commands), if the measured data of the measured cell satisfies the HO condition. The HO command sent by the DU may be sent via MAC control message and/or MAC control element and may be sent by the serving DU (e.g., DU1, associated with the serving cell) without any additional trigger or command from the centralized unit to execute the handover.

In the case of inter-DU measured cell, the measured cell may also be either intra-CU with respect to the serving cell (e.g., both measured cell and serving cell are controlled by same CU (measured cell is associated with a DU that is controlled by the same CU that controls the serving DU), or inter-CU with respect to the serving cell (e.g., the measured cell is associated with a DU that is controlled by a different CU than the DU associated with serving cell).

For example, the measured cell may be one of the following: inter-DU and intra-CU, or inter-DU and inter-CU, with respect to the serving cell of the user equipment, the method of FIG. 14 may further include: receiving, by the UE (e.g., from the CU via serving DU), a configuration for the user equipment to send a layer 3 (L3) measurement report whenever L1 measurements are not configured to be reported for L1/L2 centric mobility; determining a layer 3 (L3) measurement report for one or more cells; and sending the layer 3 (L3) measurement report to the centralized unit via a radio resource control (RRC) message, in response to the configuration or the request to send a layer 3 (L3) measurement report. The L3 measurement report may be sent via RRC message to the CU, for example.

Also, for example, the method of FIG. 14 may further include sending, by the DU to the CU, information indicating that the measured cell reported by the UE is inter-DU with respect to the serving cell, in response to the UE determining that the measured cell is inter-distributed unit with respect to the serving cell. The CU may then take appropriate action, e.g., such as sending the UE a request for a L3 measurement report.

Also, for example, based on the measurement results for beam (e.g., based on RSRP measurements of a SSB or CSI-RS of measured cell), the DU may send a HO command (either intra-DU HO command, or inter-DU HO command) to UE if the measurements (measurement data) satisfy a HO condition. If the measurements of the cell do not satisfy a HO condition, but satisfy a beam-switch condition, the DU may, for example, send a beam-switching command, since there may be multiple beams within the same serving cell, and the DU may cause the UE to switch beams within serving cell.

Thus, for example, the embodiment of FIG. 14 may include one or more of the following operations:

During cell selection for initial access or mobility, if the CU-CP finds out PCI ambiguity (PCI conflict) in the cell(s) of serving DU and neighboring DUs (via the information shared between the CU and DU/other CU), the CU-CP may provide the PCI(s) of the ambiguous PCI cells to the UE in the RRC Reconfiguration message.

CU-CP may also configure the UE to report an additional 1-bit intra-DU or inter-DU FLAG when reporting L1 RSRP measurements of the ambiguous PCI cell(s) as indicated by the CU-CP.

For the ambiguous (conflicting) PCI cell(s), the UE may indicate as part of a L1 RSRP measurement report, a 1-bit flag to indicate if a cell is intra-DU or inter-DU.

For example, the UE is able to determine if a given measured cell is intra-DU or inter-DU based on the PCIGs of serving cell and measured cell. The UE may read the system information of the measured cell to obtain PCIG of measured cell, e.g., in order to set the flag (e.g., intra-DU flag) properly.

Serving DU: if measured cell signal measured satisfies a HO condition and is intra-DU, DU can send intra-DU L1 HO command to UE; likewise, if measured cell signal measured satisfies a HO condition and is inter-DU, DU can send inter-DU L1 HO command to UE, without intervention from or without receiving a command from the CU.

Serving DU: if UE is configured for inter-DU L1 (MAC message, handled by DU) HO, then serving DU can send UE an inter-DU L1 HO command; if UE is not configured for inter-DU L1 HO, then the DU may simply send a message to CU with measurement report, or PCIG, or flag, or notification of the measured/reported inter-DU cell; in parallel, serving DU may send a message (e.g., via MAC CE command) to UE to cause or trigger UE to send L3 measurements to CU (additional processing and filtering, and then send L3 measurement report to CU).

CU may take appropriate action for inter-DU handovers; for example, possibly including CU sending a L3/RRC message to UE to trigger or cause the UE to perform an inter-DU HO to target/measured cell.

Figure 15:
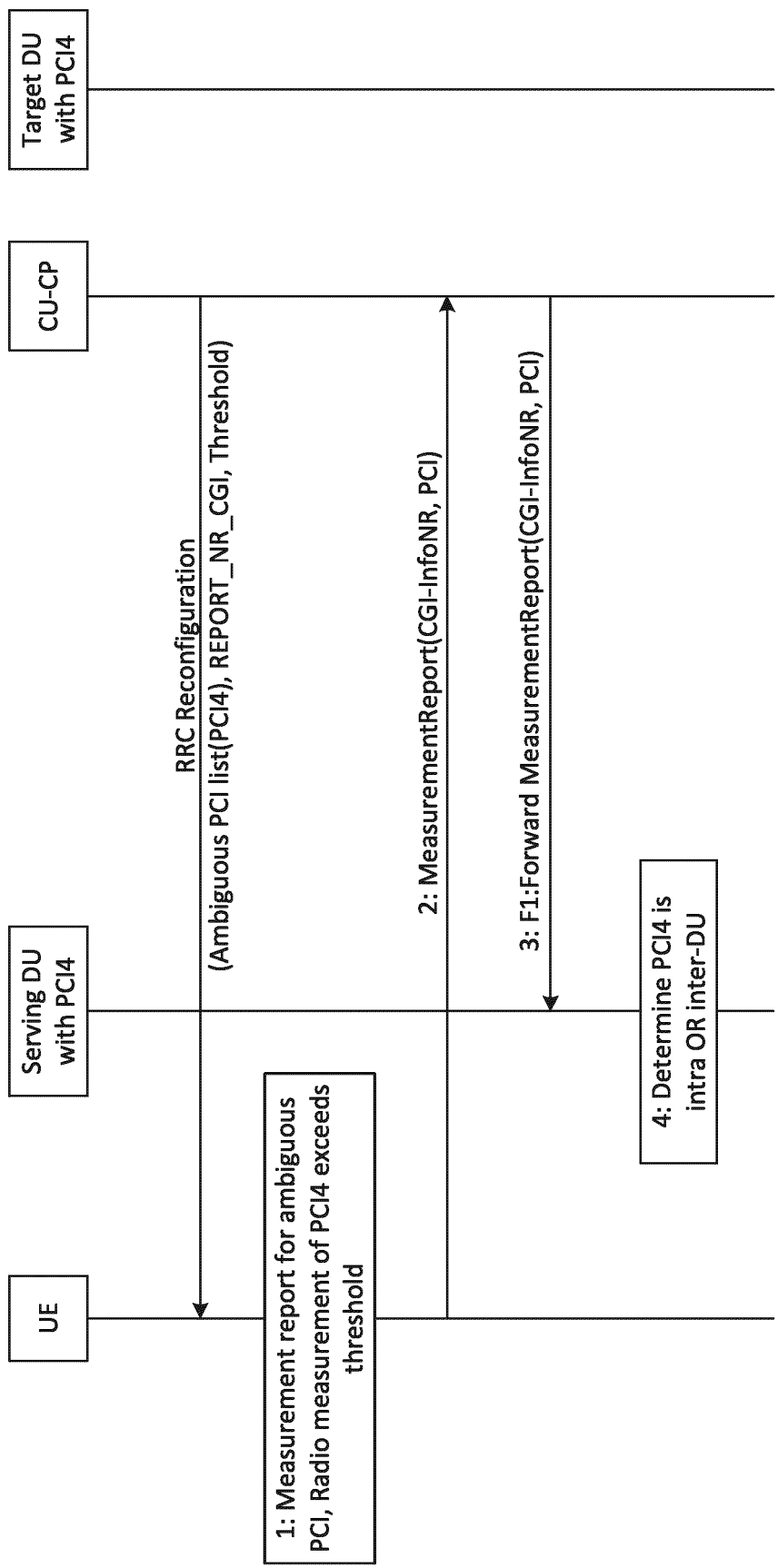
FIG. 15 is a signal diagram illustrating operation of a system according to another example embodiment.

FIG. 15 is a diagram illustrating operation of a system according to another example embodiment. With respect to FIG. 15, the CU can configure the UE pro-actively with measurement configuration, to report NR-CGI (new Radio Cell Group Identifier, which is a unique cell group identifier, that uniquely identifies the cell within the radio access network (RAN)) to the CU-CP as soon as the UE measurement for PCI-collision cell exceeds a predefined threshold. This is based on the CU-CP's knowledge of ANR, i.e., awareness of a PCI collision in the neighboring DU. The UE may report the NR-CGI of the measured cell provided it is an ambiguous PCI and it crosses the predefined threshold. The CU can further share the inter-DU or intra-DU state information of the reported cell with the DU. This may assist the DU to determine whether to trigger intra-DU or inter-DU L1/L2 HO (provided inter-DU L1/L2 HO is configured).

Alternatively, in case of source-DU receives measurements from cells that have the same PCI (e.g., PCI collision, such as DU1-PC4 and DU2-PC4) in the L1-RSRP beam measurements report, source DU may send a F1 message to the CU-CP to instruct UE to read NR-CGI of the PCI-collided cells and report as a part L3 measurements report (e.g., L3 measurement report to be sent by UE via RRC message). Here, the DU may be notified by the CU upfront or in advance about the PCI collision. In this second embodiment shown in FIG. 15, the CU may (or will) now ask UE to report NR-CGI (entire global cell identifier and gNB identifier—for entire RAN)—which may provide a full cell identity, to CU, which is forwarded to DU for decision or further action. But it may be difficult for UE to read NR-CGI, and so UE may receive instructions (e.g., indicating resources to receive) on how to read this NR-CGI. In this manner, according to this second embodiment, the DU may determine whether this measured cell is intra-DU or inter-DU.

Figure 16:
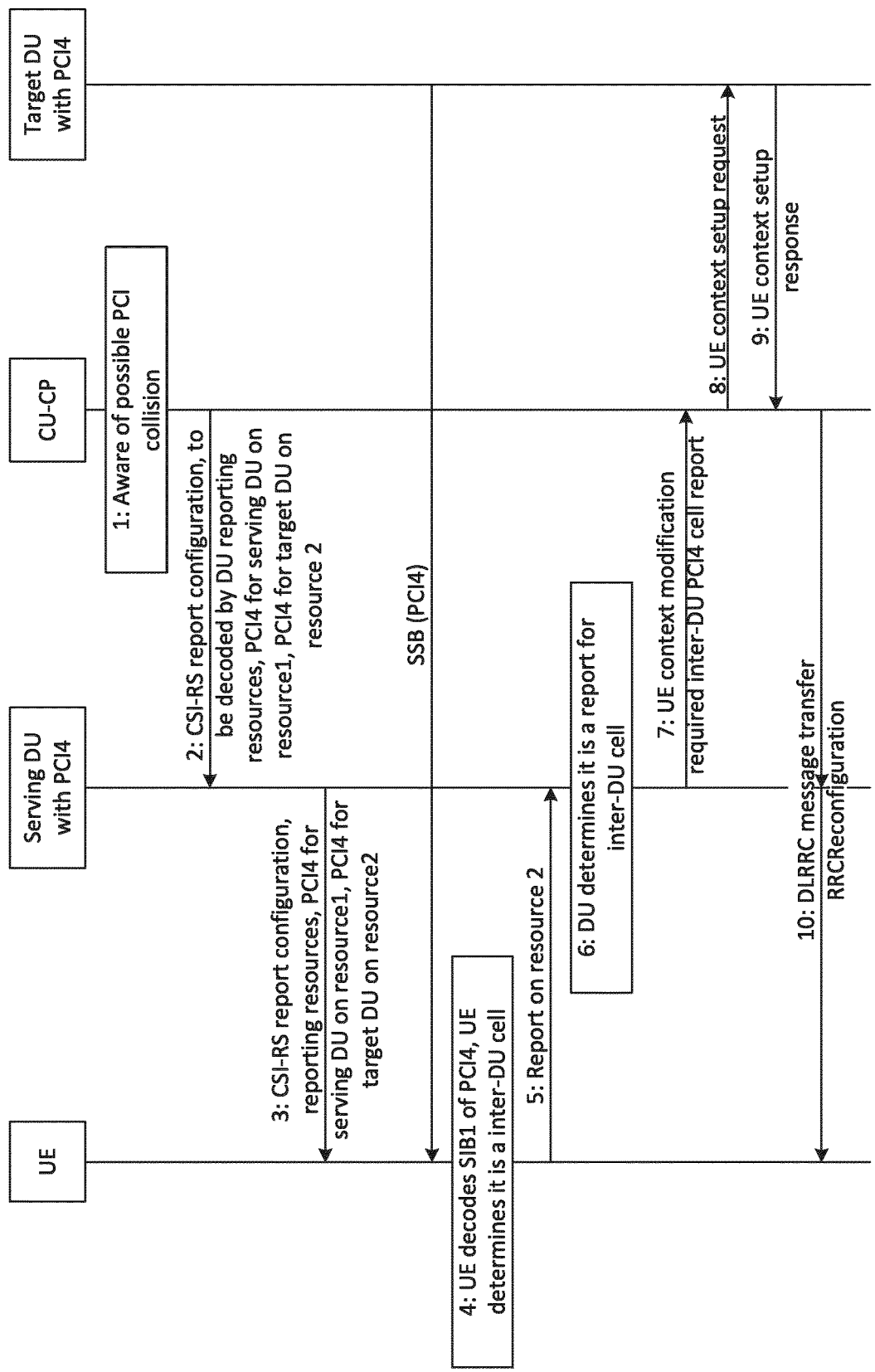
FIG. 16 is a signal diagram illustrating operation of a system according to yet another example embodiment.

FIG. 16 is a diagram illustrating operation of a system according to yet another example embodiment. With respect to third embodiment of FIG. 16, it is assumed that the same problem exists (a PCI collision or PCI conflict). This solution may be divided into A) and B).

A): Inter-frequency PCI collision: UE can use cell frequency to determine if a cell is intra-DU or inter-DU cell. Also, different reporting resource configuration may be used to indicate to DU which report is for which cell/DU. Inter-frequency PCI collision; cells have same PCI, and UE can measure different frequencies for DU1-PCI4 and DU2-PCI4. Because signals of each cell is transmitted on a different frequency, UE would know if this is a different DU (inter-DU), as configured previously. CU configures UE with measurement configuration (request UE to measure these cells on these frequencies); this configuration may be done transparently to DU; at the same time, CU configures DU indicating on which resources will be used by UE to report a certain cell measurement to DU. PCIG (or cell) specific set of time frequency resources may be indicated to report cell measurements from different PCIGs (or cells). CU may indicate to DU a PCIG-resource (or cell-resource) map for reporting cells, wherein the resource map or table may typically be UE specific. This table or map may also be provided to UE. Note that the CU configures the DU with this table or map.

For example, UE is configured by CU with reporting resource1 for freq1-PCI4 and resource2 for freq2-PCI4 (NOTE: PCI 4 is an example). DU is configured by CU with resource1 for UE that indicates reports for freq1-PCI4, and resource2 for UE that indicates reports for freq1-PCI4. Once DU receives L1-RSRP reports on resource1—it would know it is for freq1-PCI4 or vice-versa. DU would react accordingly to trigger intra-DU L1 L2 mobility or would inform CU for inter-DU L1 L2 mobility (if inter-DU L1/L2 mobility is not supported).

B): Intra-frequency PCI collision: Each CSI report configuration may be configured separately for different cells, so this means each report may be reported using a different "PUCCH-CSI-resource" (uplink control channel resources for this CSI reference signal). UE may be configured by CU with reporting resource1 for DU1-PCI4 and resource2 for DU2-PCI4. UE is configured to decode SIB1 and obtain "CU-PCIG" in case it detects PCI4 (potential PCI collision). The potential PCI collision can be configured to the UE by CU. This enables UE to use correct resources for reporting. DU is configured by CU to expect on resource1 reports (measurement reports) for DU2-PCI4 from a UE, and on resource2 reports for DU1-PCI4 from a UE. Once DU receives L1-RSRP measurement reports on resource1—DU can determine if it is for DU1-PCI1 or vice-versa. DU may react accordingly to trigger for intra-DU L1/L2 mobility or may inform CU for inter-DU L1 L2 mobility (if inter-DU L1/L2 mobility is not supported).

Also, the various features of embodiments of FIGS. 14, 15 and 16 may be combined in any manner. For example, one or more of the features shown for FIG. 15 or 16 may be added to the embodiment of FIG. 14 or to one or more features of the embodiment of FIG. 14.

Some illustrative examples will now be described.

Figure 17:
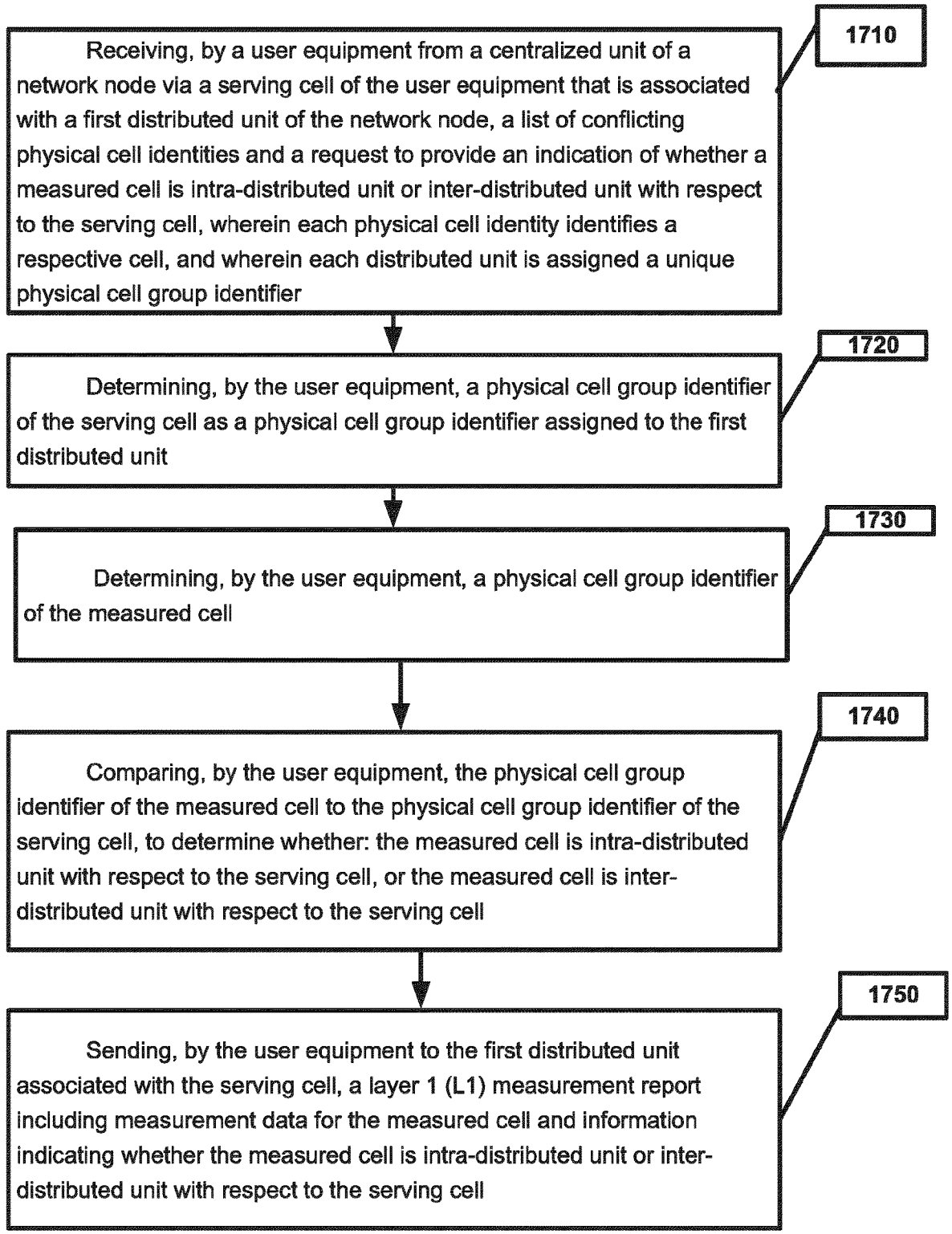
FIG. 17 is a flow chart illustrating operation of a user equipment according to an example embodiment.

Example 1. FIG. 17 is a flow chart illustrating operation of a user equipment according to an example embodiment. Operation 1710 includes receiving, by a user equipment from a centralized unit of a network node via a serving cell of the user equipment that is associated with a first distributed unit of the network node, a list of conflicting physical cell identities and a request to provide an indication of whether a measured cell is intra-distributed unit or inter-distributed unit with respect to the serving cell, wherein each physical cell identity identifies a respective cell, and wherein each distributed unit is assigned a unique physical cell group identifier. Operation 1720 includes determining, by the user equipment, a physical cell group identifier of the serving cell as a physical cell group identifier assigned to the first distributed unit. Operation 1730 includes determining, by the user equipment, a physical cell group identifier of the measured cell. Operation 1740 includes comparing, by the user equipment, the physical cell group identifier of the measured cell to the physical cell group identifier of the serving cell, to determine whether: the measured cell is intra-distributed unit with respect to the serving cell, or the measured cell is inter-distributed unit with respect to the serving cell. Operation 1750 includes sending, by the user equipment to the first distributed unit associated with the serving cell, a layer 1 (L1) measurement report including measurement data for the measured cell and information indicating whether the measured cell is intra-distributed unit or inter-distributed unit with respect to the serving cell.

Example 2. The method of example 1, wherein conflicting physical cell identities indicate that a same physical cell identity has been assigned to different cells associated with different distributed units, wherein a measured cell being intra-distributed unit with respect to the serving cell of the user equipment indicates that the measured cell is associated with the first distributed unit that is also associated with the serving cell, and wherein a measured cell being inter-distributed unit with respect to the serving cell of the user equipment indicates that the measured cell is associated with a second distributed unit that is different than the first distributed unit.

Example 3. The method of any of examples 1-2, wherein the comparing comprises: comparing, by the user equipment, the physical cell group identifier of the measured cell to the physical cell group identifier of the serving cell, to determine whether: the measured cell is intra-distributed unit with respect to the serving cell based on the physical cell group identifier of the measured cell being the same as the physical cell group identifier of the serving cell, or the measured cell is inter-distributed unit based on the physical cell group identifier of the measured cell being different than the physical cell group identifier of the serving cell.

Example 4. The method of any of example 1, wherein the determining, by the user equipment, a physical cell group identifier of the measured cell comprises one of the following: receiving, by the user equipment, system information from the measured cell, including information identifying a physical cell group identifier of a distributed unit associated with the measured cell, which is the same as the physical cell group identifier of the first distributed unit associated with the serving cell; or, receiving, by the user equipment, system information from the measured cell, including information identifying a physical cell group identifier of the distributed unit associated with the measured cell, which is different than the physical cell group identifier of the first distributed unit associated with the serving cell.

Example 5. The method of any of examples 1-4, wherein the determining, by the user equipment, a physical cell group identifier of the serving cell comprises: receiving, by the user equipment, configuration information from the centralized unit of the network node, indicating the physical cell group identifier of the first distributed unit associated with the serving cell.

Example 6. The method of example 5, wherein the receiving configuration information comprises: receiving, by the user equipment, mapping data representing a mapping between the physical cell identifier of the serving cell and the physical cell group identifier of the first distributed unit.

Example 7. The method of any of examples 1-6, further comprising: receiving, by the user equipment, system information from cells having a physical cell identity listed in the list of conflicting physical cell identities, to obtain a physical cell group identifier for cells having physical cell identities listed in the list of conflicting physical cell identities, while omitting to obtain a physical cell group identifiers for cells having physical cell identities that are not listed in the list of conflicting physical cell identities.

Example 8. The method of any of examples 1-7, further comprising: receiving, by the user equipment from the first distributed unit associated with the serving cell via layer 1 (L1) or layer 2 (L2) control message, an intra-distributed unit handover request to instruct the user equipment to perform a handover or cell change from the serving cell to the measured cell if measurement data of the measured cell satisfies a handover condition and the measured cell is intra-distributed unit with respect to the serving cell.

Example 9. The method of any of examples 1-8, further comprising: receiving, by the user equipment from the first distributed unit associated with the serving cell via layer 1 (L1) or layer 2 (L2) control message, an inter-distributed unit handover request to instruct the user equipment to perform a handover or cell change from the serving cell to the measured cell if the measurement data of the measured cell satisfies a handover condition and the measured cell is inter-distributed unit with respect to the serving cell.

Example 10. The method of any of examples 8 or 9, wherein the layer 1 (L1) or layer 2 (L2) control message comprises a media access control (MAC) control message and/or a MAC control element sent by the first distributed unit, without any additional trigger or command from the centralized unit to execute the handover.

Example 11. The method of any of examples 1-10, wherein the measured cell is one of the following: inter-distributed unit and intra-centralized unit, or inter-distributed unit and inter-centralized unit, with respect to the serving cell of the user equipment, the method comprising: receiving, by the user equipment, a configuration for the user equipment to send a layer 3 (L3) measurement report; determining a layer 3 (L3) measurement report for one or more cells; and sending the layer 3 (L3) measurement report to the centralized unit via a radio resource control (RRC) message, in response to the configuration or the request to send a layer 3 (L3) measurement report.

Example 12. The method of any of examples 1-11, further comprising: sending, by the user equipment to the centralized unit, information indicating that the measured cell is inter-distributed unit with respect to the serving cell, in response to the user equipment determining that the measured cell is inter-distributed unit with respect to the serving cell.

Example 13. A computer program product including a non-transitory computer-readable storage medium and storing executable code that, when executed by at least one data processing apparatus, is configured to cause the at least one data processing apparatus to perform the method of any of examples 1-12.

Example 14. An apparatus comprising means for performing the method according to any of examples 1-12.

Example 15. An apparatus, comprising: at least one processor; and at least one memory including computer program code; the at least one memory and the computer program code configured to cause the apparatus at least to: receive, by a user equipment from a centralized unit of a network node via a serving cell of the user equipment that is associated with a first distributed unit of the network node, a list of conflicting physical cell identities and a request to provide an indication of whether a measured cell is intra-distributed unit or inter-distributed unit with respect to the serving cell, wherein each physical cell identity identifies a respective cell, and wherein each distributed unit is assigned a unique physical cell group identifier; determine, by the user equipment, a physical cell group identifier of the serving cell as a physical cell group identifier assigned to the first distributed unit; determine, by the user equipment, a physical cell group identifier of the measured cell; compare, by the user equipment, the physical cell group identifier of the measured cell to the physical cell group identifier of the serving cell, to determine whether: the measured cell is intra-distributed unit with respect to the serving cell, or the measured cell is inter-distributed unit with respect to the serving cell; and send, by the user equipment to the first distributed unit associated with the serving cell, a layer 1 (L1) measurement report including measurement data for the measured cell and information indicating whether the measured cell is intra-distributed unit or inter-distributed unit with respect to the serving cell.

Example 16. The apparatus of example 15, wherein conflicting physical cell identities indicate that a same physical cell identity has been assigned to different cells associated with different distributed units, wherein a measured cell being intra-distributed unit with respect to the serving cell of the user equipment indicates that the measured cell is associated with the first distributed unit that is also associated with the serving cell, and wherein a measured cell being inter-distributed unit with respect to the serving cell of the user equipment indicates that the measured cell is associated with a second distributed unit that is different than the first distributed unit.

Example 17. The apparatus of any of examples 15-16, wherein the at least one processor and the computer program code configured to cause the apparatus to compare comprises the at least one processor and the computer program code configured to cause the apparatus to: compare, by the user equipment, the physical cell group identifier of the measured cell to the physical cell group identifier of the serving cell, to determine whether: the measured cell is intra-distributed unit with respect to the serving cell based on the physical cell group identifier of the measured cell being the same as the physical cell group identifier of the serving cell, or the measured cell is inter-distributed unit based on the physical cell group identifier of the measured cell being different than the physical cell group identifier of the serving cell.

Example 18. The apparatus of example 15, wherein the at least one processor and the computer program code configured to cause the apparatus to determine a physical cell group identifier of the measured cell comprises the at least one processor and the computer program code configured to cause the apparatus to perform one of the following: receive, by the user equipment, system information from the measured cell, including information identifying a physical cell group identifier of a distributed unit associated with the measured cell, which is the same as the physical cell group identifier of the first distributed unit associated with the serving cell; or receive, by the user equipment, system information from the measured cell, including information identifying a physical cell group identifier of the distributed unit associated with the measured cell, which is different than the physical cell group identifier of the first distributed unit associated with the serving cell.

Example 19. The apparatus of any of examples 15-18, wherein the at least one processor and the computer program code configured to cause the apparatus to determine a physical cell group identifier of the serving cell comprises the at least one processor and the computer program code configured to cause the apparatus to: receive, by the user equipment, configuration information from the centralized unit of the network node, indicating the physical cell group identifier of the first distributed unit associated with the serving cell.

Example 20. The apparatus of example 19, wherein the at least one processor and the computer program code configured to receive configuration information comprises the at least one processor and the computer program code configured to: receive, by the user equipment, mapping data representing a mapping between a physical cell identifier of the serving cell and the physical cell group identifier of the first distributed unit.

Example 21. The apparatus of any of examples 15-20, wherein the at least one processor and the computer program code configured to further cause the apparatus to: receive, by the user equipment, system information from cells having a physical cell identity listed in the list of conflicting physical cell identities, to obtain a physical cell group identifier for cells having physical cell identities listed in the list of conflicting physical cell identities, while omitting to obtain a physical cell group identifiers for cells having physical cell identities that are not listed in the list of conflicting physical cell identities.

Example 22. The apparatus of any of examples 15-21, wherein the at least one processor and the computer program code configured to further cause the apparatus to: receive, by the user equipment from the first distributed unit associated with the serving cell via layer 1 (L1) or layer 2 (L2) control message, an intra-distributed unit handover request to instruct the user equipment to perform a handover or cell change from the serving cell to the measured cell if measurement data of the measured cell satisfies a handover condition and the measured cell is intra-distributed unit with respect to the serving cell.

Example 23. The apparatus of any of examples 15-22, wherein the at least one processor and the computer program code configured to further cause the apparatus to: receive, by the user equipment from the first distributed unit associated with the serving cell via layer 1 (L1) or layer 2 (L2) control message, an inter-distributed unit handover request to instruct the user equipment to perform a handover or cell change from the serving cell to the measured cell if the measurement data of the measured cell satisfies a handover condition and the measured cell is inter-distributed unit with respect to the serving cell.

Example 24. The apparatus of any of examples 22 or 23, wherein the layer 1 (L1) or layer 2 (L2) control message comprises a media access control (MAC) control message and/or a MAC control element sent by the first distributed unit, without any additional trigger or command from the centralized unit to execute the handover.

Example 25. The apparatus of any of examples 15-24, wherein the measured cell is one of the following: inter-distributed unit and intra-centralized unit, or inter-distributed unit and inter-centralized unit, with respect to the serving cell of the user equipment, wherein the at least one processor and the computer program code configured to further cause the apparatus to: receive, by the user equipment, a configuration for the user equipment to send a layer 3 (L3) measurement report; determine a layer 3 (L3) measurement report for one or more cells; and send the layer 3 (L3) measurement report to the centralized unit via a radio resource control (RRC) message, in response to the configuration or the request to send a layer 3 (L3) measurement report.

Example 26. The apparatus of any of examples 15-25, wherein the at least one processor and the computer program code configured to further cause the apparatus to: send, by the user equipment to the centralized unit, information indicating that the measured cell is inter-distributed unit with respect to the serving cell, in response to the user equipment determining that the measured cell is inter-distributed unit with respect to the serving cell.

Figure 18:
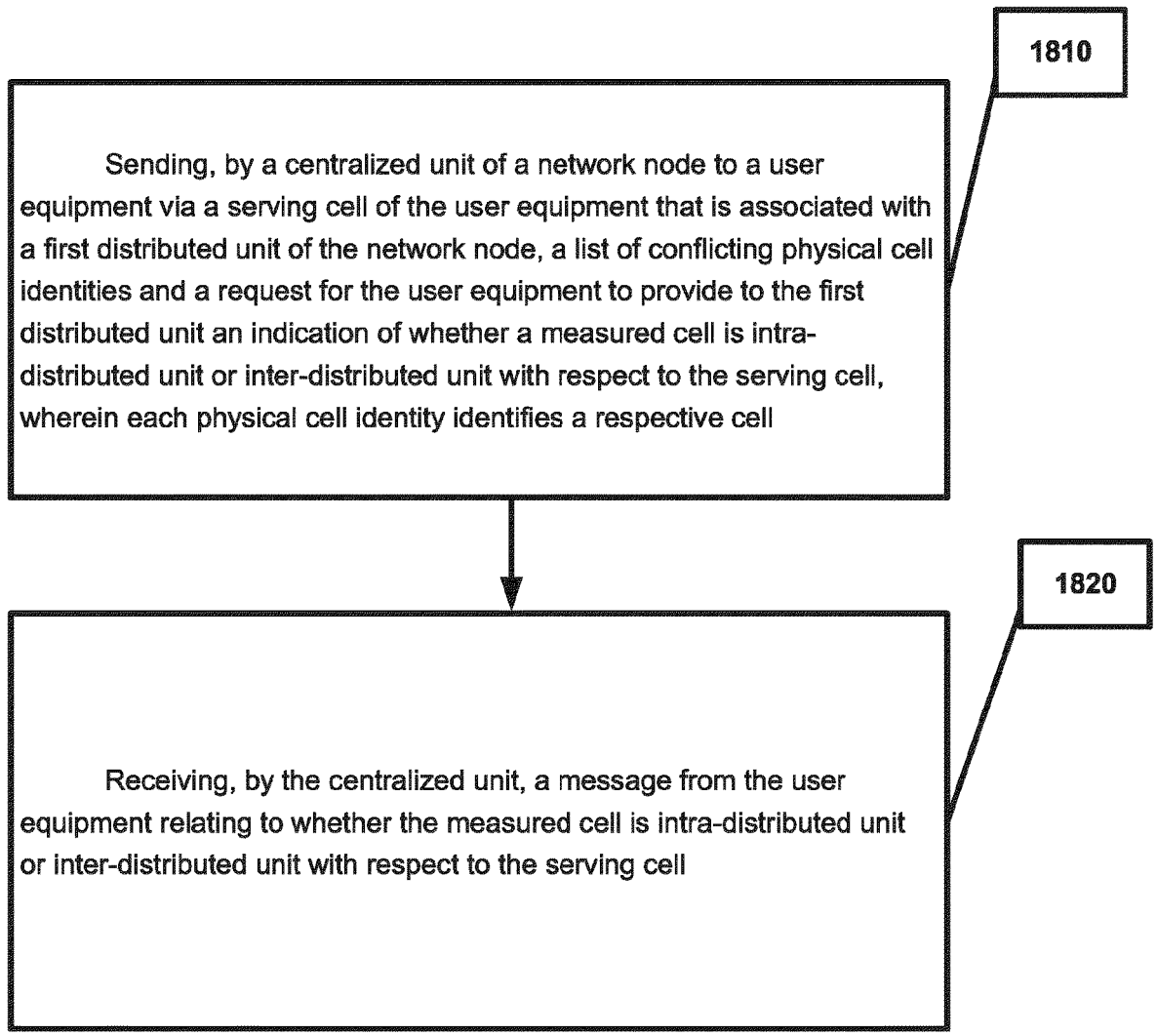
FIG. 18 is a flow chart illustrating operation of a centralized unit according to an example embodiment.

Example 27. FIG. 18 is a flow chart illustrating operation of a centralized unit according to an example embodiment. Operation 1810 includes sending, by a centralized unit of a network node to a user equipment via a serving cell of the user equipment that is associated with a first distributed unit of the network node, a list of conflicting physical cell identities and a request for the user equipment to provide to the first distributed unit an indication of whether a measured cell is intra-distributed unit or inter-distributed unit with respect to the serving cell, wherein each physical cell identity identifies a respective cell. Operation 1820 includes receiving, by the centralized unit, a message from the user equipment relating to whether the measured cell is intra-distributed unit or inter-distributed unit with respect to the serving cell.

Example 28. The method of example 27: wherein each distributed unit is assigned a unique physical cell group identifier; wherein conflicting physical cell identities indicate that a same physical cell identity has been assigned to different cells associated with different distributed units; wherein a measured cell being intra-distributed unit with respect to the serving cell of the user equipment indicates that the measured cell is associated with the first distributed unit that is also associated with the serving cell; and wherein a measured cell being inter-distributed unit with respect to the serving cell of the user equipment indicates that the measured cell is associated with a second distributed unit that is different than the first distributed unit.

Example 29. The method of any of examples 27-28, wherein the receiving, by the centralized unit, a message from the user equipment relating to whether the measured cell is intra-distributed unit or inter-distributed unit with respect to the serving cell comprises receiving, by the centralized unit, at least one of the following: an indication indicating whether the measured cell is intra-distributed unit or inter-distributed unit with respect to the serving cell; an indication indicating that the measured cell is inter-distributed unit with respect to the serving cell; and/or a layer 3 (L3) measurement report via a radio resource control (RRC) message, when the measured cell is either: inter-distributed unit and intra-centralized unit, or inter-distributed unit and inter-centralized unit, with respect to the serving cell of the user equipment, as configured by the network node.

Example 30. A computer program product including a non-transitory computer-readable storage medium and storing executable code that, when executed by at least one data processing apparatus, is configured to cause the at least one data processing apparatus to perform the method of any of examples 27-29.

Example 31. An apparatus comprising means for performing the method according to any of examples 27-29.

Example 32. An apparatus, comprising: at least one processor; and at least one memory including computer program code; the at least one memory and the computer program code configured to cause the apparatus at least to: send, by a centralized unit of a network node to a user equipment via a serving cell of the user equipment that is associated with a first distributed unit of the network node, a list of conflicting physical cell identities and a request for the user equipment to provide to the first distributed unit an indication of whether a measured cell is intra-distributed unit or inter-distributed unit with respect to the serving cell, wherein each physical cell identity identifies a respective cell; and receive, by the centralized unit, a message from the user equipment relating to whether the measured cell is intra-distributed unit or inter-distributed unit with respect to the serving cell.

Example 33. The apparatus of example 32: wherein each distributed unit is assigned a unique physical cell group identifier; wherein conflicting physical cell identities indicate that a same physical cell identity has been assigned to different cells associated with different distributed units; wherein a measured cell being intra-distributed unit with respect to the serving cell of the user equipment indicates that the measured cell is associated with the first distributed unit that is also associated with the serving cell; and wherein a measured cell being inter-distributed unit with respect to the serving cell of the user equipment indicates that the measured cell is associated with a second distributed unit that is different than the first distributed unit.

Example 34. The apparatus of any of examples 32-33, wherein the at least one processor and the computer program code configured to cause the apparatus to receive, by the centralized unit, a message from the user equipment relating to whether the measured cell is intra-distributed unit or inter-distributed unit with respect to the serving cell comprises the at least one processor and the computer program code configured to cause the apparatus to receive at least one of the following: an indication indicating whether the measured cell is intra-distributed unit or inter-distributed unit with respect to the serving cell; an indication indicating that the measured cell is inter-distributed unit with respect to the serving cell; and/or a layer 3 (L3) measurement report via a radio resource control (RRC) message, when the measured cell is either: inter-distributed unit and intra-centralized unit, or inter-distributed unit and inter-centralized unit, with respect to the serving cell of the user equipment, as configured by the network node.

Figure 19:
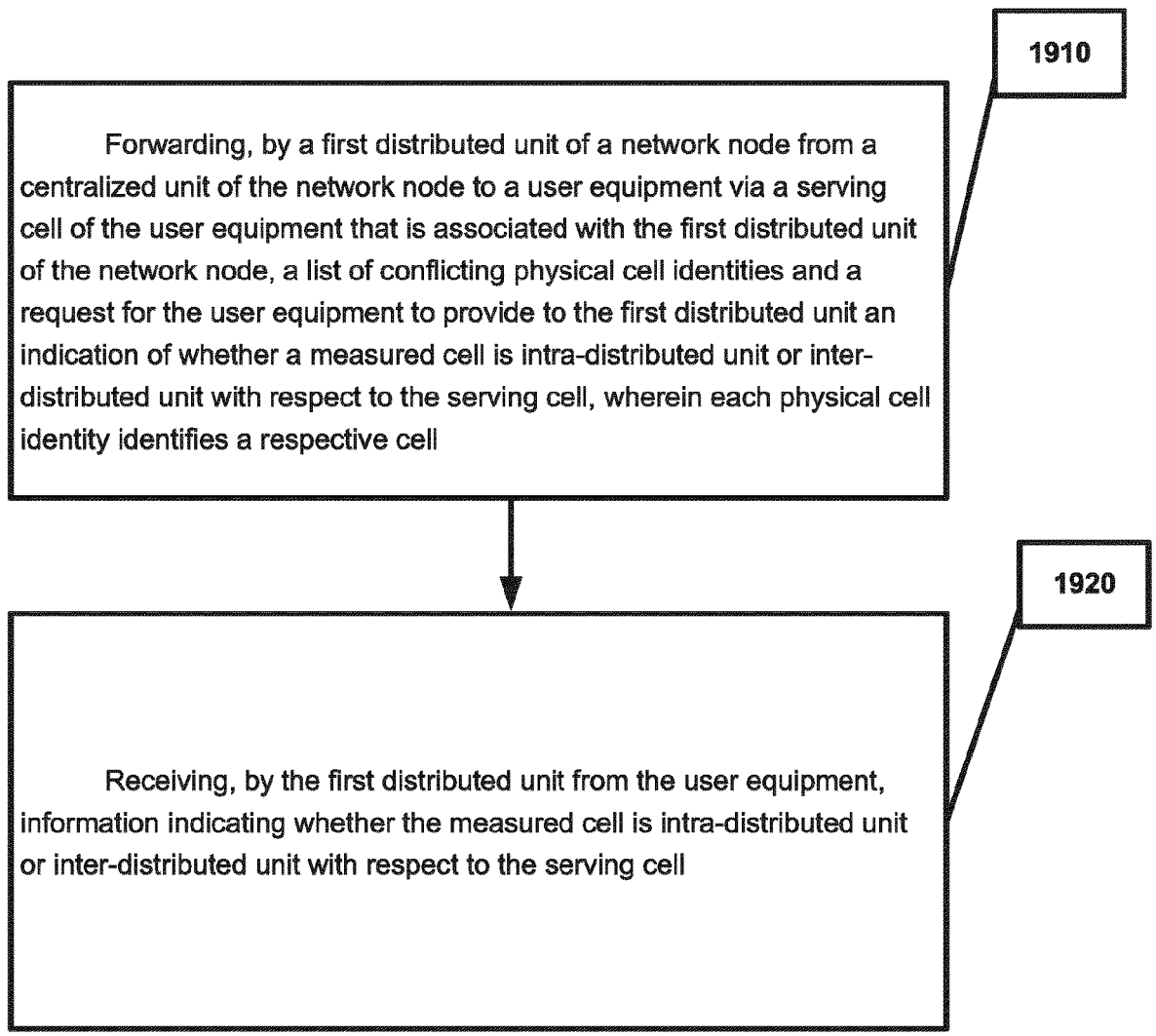
FIG. 19 is a flow chart illustrating operation of a distributed unit according to an example embodiment.

Example 35. FIG. 19 is a flow chart illustrating operation of a distributed unit according to an example embodiment. Operation 1910 includes forwarding, by a first distributed unit of a network node from a centralized unit of the network node to a user equipment via a serving cell of the user equipment that is associated with the first distributed unit of the network node, a list of conflicting physical cell identities and a request for the user equipment to provide to the first distributed unit an indication of whether a measured cell is intra-distributed unit or inter-distributed unit with respect to the serving cell, wherein each physical cell identity identifies a respective cell. And, operation 1920 includes receiving, by the first distributed unit from the user equipment, information indicating whether the measured cell is intra-distributed unit or inter-distributed unit with respect to the serving cell.

Example 36. The method of example 35: wherein each distributed unit is assigned a unique physical cell group identifier; wherein conflicting physical cell identities indicate that a same physical cell identity has been assigned to different cells associated with different distributed units; wherein a measured cell being intra-distributed unit with respect to the serving cell of the user equipment indicates that the measured cell is associated with the first distributed unit that is also associated with the serving cell; and wherein a measured cell being inter-distributed unit with respect to the serving cell of the user equipment indicates that the measured cell is associated with a second distributed unit that is different than the first distributed unit.

Example 37. The method of any of examples 35-36, wherein the receiving comprises: receiving, by the first distributed unit from the user equipment, a measurement report including at least measurement data for the measured cell and information indicating whether the measured cell is intra-distributed unit or inter-distributed unit.

Example 38. The method of any of examples 35-37, further comprising: sending, by the first distributed unit associated with the serving cell to the user equipment via a layer 1 (L1) or layer 2 (L2) control message, an intra-distributed unit handover request to instruct the user equipment to perform a handover or cell change from the serving cell to the measured cell if the measured cell triggers a handover and the measured cell is intra-distributed unit with respect to the serving cell; or sending, by the first distributed unit associated with the serving cell to the user equipment via a layer 1 (L1) or layer 2 (L2) control message, an inter-distributed unit handover request to instruct the user equipment to perform a handover or cell change from the serving cell to the measured cell if the measured cell triggers a handover and the measured cell is inter-distributed unit with respect to the serving cell.

Example 39. The method of example 38, wherein the layer 1 (L1) or layer 2 (L2) control message comprises a media access control (MAC) control message and/or a MAC control element sent by the first distributed unit, without instruction or command from the centralized unit.

Example 40. The method of any of examples 35-39, wherein receiving information from the user equipment comprises receiving from the user equipment information indicating that the measured cell is one of the following: inter-distributed unit and intra-centralized unit, or inter-distributed unit and inter-centralized unit, with respect to the serving cell of the user equipment, and the first distributed unit associated with the serving cell not having been configured for inter-distributed unit layer 1 based mobility and indicating to the centralized unit for further actions or indicating to the user equipment using a MAC control element to send layer 3 measurements to the centralized unit.

Example 41. A computer program product including a non-transitory computer-readable storage medium and storing executable code that, when executed by at least one data processing apparatus, is configured to cause the at least one data processing apparatus to perform the method of any of examples 35-40.

Example 42. An apparatus comprising means for performing the method according to any of examples 35-40.

Example 43. An apparatus, comprising: at least one processor; and at least one memory including computer program code; the at least one memory and the computer program code configured to cause the apparatus at least to: forward, by a first distributed unit of a network node from a centralized unit of the network node to a user equipment via a serving cell of the user equipment that is associated with the first distributed unit of the network node, a list of conflicting physical cell identities and a request for the user equipment to provide to the first distributed unit an indication of whether a measured cell is intra-distributed unit or inter-distributed unit with respect to the serving cell, wherein each physical cell identity identifies a respective cell; and receive, by the first distributed unit from the user equipment, information indicating whether the measured cell is intra-distributed unit or inter-distributed unit with respect to the serving cell.

Example 44. The apparatus of example 43: wherein each distributed unit is assigned a unique physical cell group identifier; wherein conflicting physical cell identities indicate that a same physical cell identity has been assigned to different cells associated with different distributed units; wherein a measured cell being intra-distributed unit with respect to the serving cell of the user equipment indicates that the measured cell is associated with the first distributed unit that is also associated with the serving cell; and wherein a measured cell being inter-distributed unit with respect to the serving cell of the user equipment indicates that the measured cell is associated with a second distributed unit that is different than the first distributed unit.

Example 45. The apparatus of any of examples 43-44, wherein the at least one processor and the computer program code configured to cause the apparatus to receive comprises the at least one processor and the computer program code configured to cause the apparatus to: receive, by the first distributed unit from the user equipment, a measurement report including at least measurement data for the measured cell and information indicating whether the measured cell is intra-distributed unit or inter-distributed unit.

Example 46. The apparatus of any of examples 43-45, the at least one processor and the computer program code configured to further cause the apparatus to: send, by the first distributed unit associated with the serving cell to the user equipment via a layer 1 (L1) or layer 2 (L2) control message, an intra-distributed unit handover request to instruct the user equipment to perform a handover or cell change from the serving cell to the measured cell if the measured cell triggers a handover and the measured cell is intra-distributed unit with respect to the serving cell; or send, by the first distributed unit associated with the serving cell to the user equipment via a layer 1 (L1) or layer 2 (L2) control message, an inter-distributed unit handover request to instruct the user equipment to perform a handover or cell change from the serving cell to the measured cell if the measured cell triggers a handover and the measured cell is inter-distributed unit with respect to the serving cell.

Example 47. The apparatus of example 46, wherein the layer 1 (L1) or layer 2 (L2) control message comprises a media access control (MAC) control message and/or a MAC control element sent by the first distributed unit, without instruction or command from the centralized unit.

Example 48. The apparatus of any of examples 43-47, wherein the apparatus configured to receive information from the user equipment comprises the apparatus configured to receive from the user equipment information indicating that the measured cell is one of the following: inter-distributed unit and intra-centralized unit, or inter-distributed unit and inter-centralized unit, with respect to the serving cell of the user equipment, and the first distributed unit associated with the serving cell not having been configured for inter-distributed unit layer 1 based mobility and indicating to the centralized unit for further actions or indicating to the user equipment using a MAC control element to send layer 3 measurements to the centralized unit.

LIST OF EXAMPLE ABBREVIATIONS

| | |
|---|---|
| AP | Access Point |
| BWP | Bandwidth Part |
| C-RNTI | Cell RNTI |
| CSI | Channel state information |
| CSI-RS | CSI reference signal |
| D-MIMO | Distributed MIMO |
| DL | Downlink |
| DM-RS | Demodulation reference signal |
| gNB | 5G Base Station |
| MIMO | Multi-Input Multi-Output |
| NR | New Radio (5G) |
| PL | Path Loss |
| PRACH | Physical RACH |
| PDSCH | Physical downlink shared channel |
| PUSCH | Physical uplink shared channel |
| RACH | Random Access Channel |
| RAR | RACH Response |
| RNTI | Radio Network Temporary Identifier |
| RS | Reference Signal |
| RSRP | Reference Signal Received Power |
| Rx | Receive |
| Rx-Tx | Receive-Transmit |
| SFN | Single Frequency Network |
| SSB | Synchronization Signal Block |
| TRP | Transmission/Reception Point |
| Tx | Transmit |
| UE | User Equipment |
| UL | Uplink |

Figure 20:
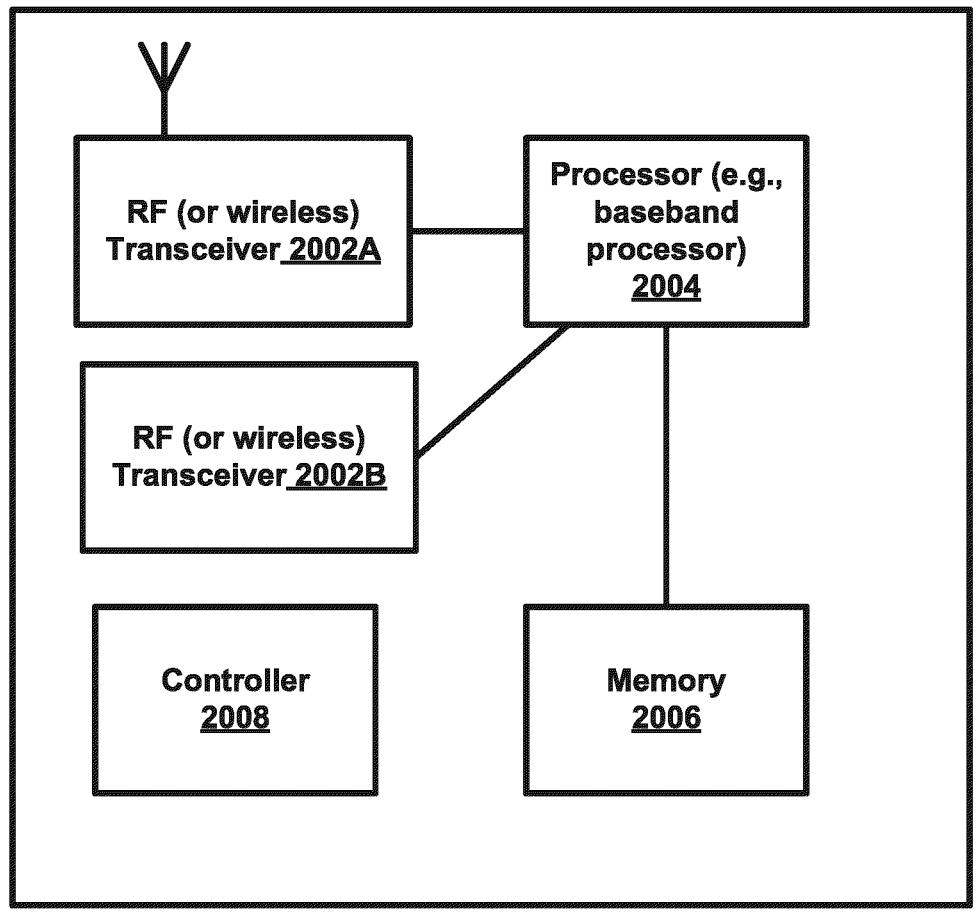
FIG. 20 is a block diagram of a node or wireless station (e.g., base station/access point, relay node, or mobile station/user device/user equipment) according to an example implementation.

FIG. 20 is a block diagram of a wireless station (e.g., AP, BS, e/gNB, NB-IoT UE, UE or user device) 2000 according to an example implementation. The wireless station 2000 may include, for example, one or multiple RF (radio frequency) or wireless transceivers 2002A, 2002B, where each wireless transceiver includes a transmitter to transmit signals (or data) and a receiver to receive signals (or data). The wireless station also includes a processor or control unit/entity (controller) 2004 to execute instructions or software and control transmission and receptions of signals, and a memory 2006 to store data and/or instructions.

Processor 2004 may also make decisions or determinations, generate slots, subframes, packets or messages for transmission, decode received slots, subframes, packets or messages for further processing, and other tasks or functions described herein. Processor 2004, which may be a baseband processor, for example, may generate messages, packets, frames or other signals for transmission via wireless transceiver 2002 (2002A or 2002B). Processor 2004 may control transmission of signals or messages over a wireless network, and may control the reception of signals or messages, etc., via a wireless network (e.g., after being down-converted by wireless transceiver 2002, for example). Processor 2004 may be programmable and capable of executing software or other instructions stored in memory or on other computer media to perform the various tasks and functions described above, such as one or more of the tasks or methods described above. Processor 2004 may be (or may include), for example, hardware, programmable logic, a programmable processor that executes software or firmware, and/or any combination of these. Using other terminology, processor 2004 and transceiver 2002 together may be considered as a wireless transmitter/receiver system, for example.

In addition, referring to FIG. 20, a controller (or processor) 2008 may execute software and instructions, and may provide overall control for the station 2000, and may provide control for other systems not shown in FIG. 20 such as controlling input/output devices (e.g., display, keypad), and/or may execute software for one or more applications that may be provided on wireless station 2000, such as, for example, an email program, audio/video applications, a word processor, a Voice over IP application, or other application or software.

In addition, a storage medium may be provided that includes stored instructions, which when executed by a controller or processor may result in the processor 2004, or other controller or processor, performing one or more of the functions or tasks described above.

According to another example implementation, RF or wireless transceiver(s) 2002A/2002B may receive signals or data and/or transmit or send signals or data. Processor 2004 (and possibly transceivers 2002A/2002B) may control the RF or wireless transceiver 2002A or 2002B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. A method comprising:
    receiving, by a user equipment from a centralized unit of a network node via a serving cell of the user equipment that is associated with a first distributed unit of the network node, a list of conflicting physical cell identities and a request to provide an indication of whether a measured cell is intra-distributed unit or inter-distributed unit with respect to the serving cell, wherein each physical cell identity identifies a respective cell, and wherein each distributed unit is assigned a unique physical cell group identifier;
    determining, by the user equipment, a physical cell group identifier of the serving cell as a physical cell group identifier assigned to the first distributed unit;
    determining, by the user equipment, a physical cell group identifier of the measured cell;
    comparing, by the user equipment, the physical cell group identifier of the measured cell to the physical cell group identifier of the serving cell, to determine whether: the measured cell is intra-distributed unit with respect to the serving cell, or the measured cell is inter-distributed unit with respect to the serving cell; and
    sending, by the user equipment to the first distributed unit associated with the serving cell, a layer 1 (L1) measurement report including measurement data for the measured cell and information indicating whether the measured cell is intra-distributed unit or inter-distributed unit with respect to the serving cell.

2. The method of claim 1, wherein conflicting physical cell identities indicate that a same physical cell identity has been assigned to different cells associated with different distributed units, wherein a measured cell being intra-distributed unit with respect to the serving cell of the user equipment indicates that the measured cell is associated with the first distributed unit that is also associated with the serving cell, and wherein a measured cell being inter-distributed unit with respect to the serving cell of the user equipment indicates that the measured cell is associated with a second distributed unit that is different than the first distributed unit.

3. The method of claim 1, wherein the comparing comprises:
    comparing, by the user equipment, the physical cell group identifier of the measured cell to the physical cell group identifier of the serving cell, to determine whether: the measured cell is intra-distributed unit with respect to the serving cell based on the physical cell group identifier of the measured cell being the same as the physical cell group identifier of the serving cell, or the measured cell is inter-distributed unit based on the physical cell group identifier of the measured cell being different than the physical cell group identifier of the serving cell.

4. The method of claim 1, wherein the determining, by the user equipment, a physical cell group identifier of the measured cell comprises one of the following:
    receiving, by the user equipment, system information from the measured cell, including information identifying a physical cell group identifier of a distributed unit associated with the measured cell, which is the same as the physical cell group identifier of the first distributed unit associated with the serving cell; or receiving, by the user equipment, system information from the measured cell, including information identifying a physical cell group identifier of the distributed unit associated with the measured cell, which is different than the physical cell group identifier of the first distributed unit associated with the serving cell.

5. The method of claim 1, wherein the determining, by the user equipment, a physical cell group identifier of the serving cell comprises:
receiving, by the user equipment, configuration information from the centralized unit of the network node, indicating the physical cell group identifier of the first distributed unit associated with the serving cell.

6. The method of claim 1, further comprising:
receiving, by the user equipment, system information from cells having a physical cell identity listed in the list of conflicting physical cell identities, to obtain a physical cell group identifier for cells having physical cell identities listed in the list of conflicting physical cell identities, while omitting to obtain a physical cell group identifiers for cells having physical cell identities that are not listed in the list of conflicting physical cell identities.

7. The method of claim 1, further comprising:
receiving, by the user equipment from the first distributed unit associated with the serving cell via layer 1 (L1) or layer 2 (L2) control message, an intra-distributed unit handover request to instruct the user equipment to perform a handover or cell change from the serving cell to the measured cell if measurement data of the measured cell satisfies a handover condition and the measured cell is intra-distributed unit with respect to the serving cell.

8. The method of claim 1, further comprising:
receiving, by the user equipment from the first distributed unit associated with the serving cell via layer 1 (L1) or layer 2 (L2) control message, an inter-distributed unit handover request to instruct the user equipment to perform a handover or cell change from the serving cell to the measured cell if the measurement data of the measured cell satisfies a handover condition and the measured cell is inter-distributed unit with respect to the serving cell.

9. The method of claim 7, wherein the layer 1 (L1) or layer 2 (L2) control message comprises a media access control (MAC) control message and/or a MAC control element sent by the first distributed unit, without any additional trigger or command from the centralized unit to execute the handover.

10. An apparatus, comprising:
at least one processor; and
at least one memory including computer program code;
the at least one memory and the computer program code configured to cause the apparatus at least to:
receive, by a user equipment from a centralized unit of a network node via a serving cell of the user equipment that is associated with a first distributed unit of the network node, a list of conflicting physical cell identities and a request to provide an indication of whether a measured cell is intra-distributed unit or inter-distributed unit with respect to the serving cell, wherein each physical cell identity identifies a respective cell, and wherein each distributed unit is assigned a unique physical cell group identifier;
determine, by the user equipment, a physical cell group identifier of the serving cell as a physical cell group identifier assigned to the first distributed unit;
determine, by the user equipment, a physical cell group identifier of the measured cell;
compare, by the user equipment, the physical cell group identifier of the measured cell to the physical cell group identifier of the serving cell, to determine whether: the measured cell is intra-distributed unit with respect to the serving cell, or the measured cell is inter-distributed unit with respect to the serving cell; and
send, by the user equipment to the first distributed unit associated with the serving cell, a layer 1 (L1) measurement report including measurement data for the measured cell and information indicating whether the measured cell is intra-distributed unit or inter-distributed unit with respect to the serving cell.

11. The apparatus of claim 10, wherein conflicting physical cell identities indicate that a same physical cell identity has been assigned to different cells associated with different distributed units, wherein a measured cell being intra-distributed unit with respect to the serving cell of the user equipment indicates that the measured cell is associated with the first distributed unit that is also associated with the serving cell, and wherein a measured cell being inter-distributed unit with respect to the serving cell of the user equipment indicates that the measured cell is associated with a second distributed unit that is different than the first distributed unit.

12. The apparatus of claim 10, wherein the at least one processor and the computer program code configured to cause the apparatus to compare comprises the at least one processor and the computer program code configured to cause the apparatus to:
compare, by the user equipment, the physical cell group identifier of the measured cell to the physical cell group identifier of the serving cell, to determine whether: the measured cell is intra-distributed unit with respect to the serving cell based on the physical cell group identifier of the measured cell being the same as the physical cell group identifier of the serving cell, or the measured cell is inter-distributed unit based on the physical cell group identifier of the measured cell being different than the physical cell group identifier of the serving cell.

13. The apparatus of claim 10, wherein the at least one processor and the computer program code configured to cause the apparatus to determine a physical cell group identifier of the measured cell comprises the at least one processor and the computer program code configured to cause the apparatus to perform one of the following:
receive, by the user equipment, system information from the measured cell, including information identifying a physical cell group identifier of a distributed unit associated with the measured cell, which is the same as the physical cell group identifier of the first distributed unit associated with the serving cell; or
receive, by the user equipment, system information from the measured cell, including information identifying a physical cell group identifier of the distributed unit associated with the measured cell, which is different than the physical cell group identifier of the first distributed unit associated with the serving cell.

14. The apparatus of claim 10, wherein the at least one processor and the computer program code configured to cause the apparatus to determine a physical cell group identifier of the serving cell comprises the at least one processor and the computer program code configured to cause the apparatus to:

receive, by the user equipment, configuration information from the centralized unit of the network node, indicating the physical cell group identifier of the first distributed unit associated with the serving cell.

15. The apparatus of claim 10, wherein the at least one processor and the computer program code configured to further cause the apparatus to:
receive, by the user equipment, system information from cells having a physical cell identity listed in the list of conflicting physical cell identities, to obtain a physical cell group identifier for cells having physical cell identities listed in the list of conflicting physical cell identities, while omitting to obtain a physical cell group identifiers for cells having physical cell identities that are not listed in the list of conflicting physical cell identities.

16. The apparatus of claim 10, wherein the at least one processor and the computer program code configured to further cause the apparatus to:
receive, by the user equipment from the first distributed unit associated with the serving cell via layer 1 (L1) or layer 2 (L2) control message, an intra-distributed unit handover request to instruct the user equipment to perform a handover or cell change from the serving cell to the measured cell if measurement data of the measured cell satisfies a handover condition and the measured cell is intra-distributed unit with respect to the serving cell.

17. The apparatus of claim 10, wherein the at least one processor and the computer program code configured to further cause the apparatus to:
receive, by the user equipment from the first distributed unit associated with the serving cell via layer 1 (L1) or layer 2 (L2) control message, an inter-distributed unit handover request to instruct the user equipment to perform a handover or cell change from the serving cell to the measured cell if the measurement data of the measured cell satisfies a handover condition and the measured cell is inter-distributed unit with respect to the serving cell.

18. The apparatus of claim 16, wherein the layer 1 (L1) or layer 2 (L2) control message comprises a media access control (MAC) control message and/or a MAC control element sent by the first distributed unit, without any additional trigger or command from the centralized unit to execute the handover.

19. The apparatus of claim 10, wherein the measured cell is one of the following: inter-distributed unit and intra-centralized unit, or inter-distributed unit and inter-centralized unit, with respect to the serving cell of the user equipment, wherein the at least one processor and the computer program code configured to further cause the apparatus to:
receive, by the user equipment, a configuration for the user equipment to send a layer 3 (L3) measurement report;
determine a layer 3 (L3) measurement report for one or more cells; and
send the layer 3 (L3) measurement report to the centralized unit via a radio resource control (RRC) message, in response to the configuration or the request to send a layer 3 (L3) measurement report.

20. The apparatus of claim 10, wherein the at least one processor and the computer program code configured to further cause the apparatus to:
send, by the user equipment to the centralized unit, information indicating that the measured cell is inter-distributed unit with respect to the serving cell, in response to the user equipment determining that the measured cell is inter-distributed unit with respect to the serving cell.

* * * * *